, 
United States Patent

Altemueller et al.

(12) United States Patent
(10) Patent No.: US 6,355,296 B1
(45) Date of Patent: *Mar. 12, 2002

(54) FUNCTIONAL FOOD INGREDIENT

(75) Inventors: Andreas G. Altemueller, Webster Groves; Balagtas F. Guevara, Sunset Hills, both of MO (US)

(73) Assignee: Protein Technologies International, Inc., St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/803,611

(22) Filed: Feb. 28, 2001

(51) Int. Cl.$^7$ .................................................. A23J 1/00
(52) U.S. Cl. ...................................... 426/656; 426/634
(58) Field of Search ................................. 426/656, 634

(56) References Cited

U.S. PATENT DOCUMENTS

| | | |
|---|---|---|
| 3,488,770 A | 1/1970 | Atkinson |
| 3,849,391 A | 11/1974 | Egger et al. |
| 3,873,740 A | 3/1975 | Terrell |
| 3,900,573 A | 8/1975 | Freck et al. |
| 4,054,679 A | 10/1977 | Melcer et al. |
| 4,125,630 A | 11/1978 | Orthoefer .................... 426/104 |
| 4,186,218 A | 1/1980 | Comi et al. |
| 4,216,240 A | 8/1980 | Shirai et al. ................. 426/512 |
| 4,234,620 A | 11/1980 | Howard et al. |
| 4,265,925 A | 5/1981 | Campbell et al. |
| 4,315,034 A | 2/1982 | Levinson et al. |
| 4,410,554 A | 10/1983 | Sailer |
| 4,418,086 A | 11/1983 | Marino et al. |
| 4,440,798 A | 4/1984 | Huang ......................... 426/656 |
| 4,500,454 A | 2/1985 | Chang |
| 4,530,788 A | 7/1985 | Chang |
| 4,557,936 A | 12/1985 | Kudo et al. .................. 426/104 |
| 4,563,362 A | 1/1986 | Thomas et al. .............. 426/104 |
| 4,748,038 A | 5/1988 | Lewis et al. |
| RE32,725 E | 8/1988 | Howard et al. |
| 4,897,280 A | 1/1990 | Ohtsu .......................... 426/656 |
| 5,336,515 A | 8/1994 | Murphy et al. .............. 426/573 |
| 5,439,696 A | 8/1995 | Rabe et al. .................. 426/508 |
| 5,456,933 A | 10/1995 | Lee .............................. 426/549 |
| 5,626,899 A | 5/1997 | Payne et al. |
| 5,648,210 A | 7/1997 | Kerr et al. |
| 5,654,028 A | 8/1997 | Christensen et al. ........ 426/574 |
| 5,710,365 A | 1/1998 | Kerr et al. |
| 5,725,899 A | 3/1998 | Cole et al. ................... 426/598 |
| 5,858,449 A | 1/1999 | Crank et al. |
| 5,876,778 A | 3/1999 | Stewart ....................... 426/508 |
| 6,136,367 A | 10/2000 | Hoie |

FOREIGN PATENT DOCUMENTS

| | | |
|---|---|---|
| JP | 59-95828 | 11/1985 |
| WO | WO98/45448 | 10/1998 |

OTHER PUBLICATIONS

O. Maldo. Preparation and Utilization of Full–Fat Soyflour in Frankfurter Formulation, Masters Thesis, May 1988, University of the Phillipines at Los Banos.

Wolf & Cowan, Soybeans as a Food Source, CRC Press, pp. 34–39, 43–51 (1975).

*Primary Examiner*—Anthony J. Weier
(74) *Attorney, Agent, or Firm*—Richard B. Taylor

(57) ABSTRACT

A novel functional food ingredient is provided. The functional food ingredient contains an unrefined plant protein material. In one embodiment, the unrefined plant protein material of the functional food ingredient has a nitrogen solubility index of from about 30% to about 80% and at least one of the following properties: a salt tolerance index of from about 30% to about 80%; a water hydration capacity of at least 3.75 times the weight of the unrefined plant protein material; or a viscosity of at least 500 centipoise at a temperature of 15° C. to 25° C. In another embodiment, the unrefined plant protein material of the functional food ingredient has at least one of the following properties: a gel weight of at least 30 grams at a temperature of from about 15° C. to about 25° C. in a 5 fluid ounce aqueous slurry containing 5 parts water per 1 part of unrefined plant protein material, by weight; or a refrigerated gel strength of at least 50 grams when combined with 5 parts of water per part of soy material, by weight. In a particularly preferred embodiment the unrefined plant protein material is an unrefined soy protein material, most preferably soy flour, soy grits, soy meal, or soy flakes.

78 Claims, No Drawings

FUNCTIONAL FOOD INGREDIENT

FIELD OF THE INVENTION

The present invention relates to a novel functional food ingredient, a process for producing such a novel functional food ingredient, and methods for using the novel functional food ingredient.

BACKGROUND OF THE INVENTION

Plant protein materials are used as functional food ingredients, and have numerous applications in enhancing desirable characteristics in food products. Soy protein materials, in particular, have seen extensive use as functional food ingredients. Soy protein materials are used as an emulsifier in meats—including frankfurters, sausages, bologna, ground and minced meats and meat patties—to bind the meat and give the meat a good texture and a firm bite. Another common application for soy protein materials as functional food ingredients is in creamed soups, gravies, and yogurts where the soy protein material acts as a thickening agent and provides a creamy viscosity to the food product. Soy protein materials are also used as functional food ingredients in numerous other food products such as dips, dairy products, tuna, breads, cakes, macaroni, confections, whipped toppings, baked goods and many other applications.

Plant protein concentrates and plant protein isolates are plant protein materials that are most commonly used as functional food ingredients due to: 1) their high protein content; and 2) their low oligosaccharide/carbohydrate content. Soy protein concentrates and soy protein isolates are the most highly refined commercially available soy protein containing products. Both soy protein concentrates and soy protein isolates are processed to increase soy protein content and to decrease oligosacharride content relative to whole soybeans and relatively unprocessed soy protein materials such as soy flakes, soy grits, soy meal and soy flour. Soy protein concentrates are processed to contain from 65% to about 80% soy protein and little or no water soluble oligosaccharides/carbohydrates, where the major non-protein component of a soy protein concentrate is fiber. Soy protein isolates, the most highly refined soy protein product, are processed to contain at least 90% soy protein and little or no water soluble oligosaccharides/carbohydrates or fiber.

Soy protein concentrates and soy protein isolates are particularly effective functional food ingredients due to the versatility of soy protein (and the relatively high content thereof in soy protein concentrates and isolates), and to the lack of raffinose and stachyose oligosaccharides which naturally occur in soybeans. Soy protein provides gelling properties which contribute to the texture in ground and emulsified meat products. The gel structure provides dimensional stability to a cooked meat emulsion which gives the cooked meat emulsion a firm texture and gives chewiness to the cooked meat emulsion, as well as provides a matrix for retaining moisture and fats. Soy protein also acts as an emulsifier in various food applications since soy proteins are surface active and collect at oil-water interfaces, inhibiting the coalescence of fat and oil droplets. The emulsification properties of soy protein allows soy protein containing materials to be used to thicken food products such as soups and gravies. Soy protein further absorbs fat, likely as a function of its emulsification properties, and promotes fat binding in cooked foods, thereby decreasing "fatting out" of the fat in the process of cooking. Soy proteins also function to absorb water and retain it in finished food products due to the hydrophilic nature of the numerous polar side chains along the peptide backbone of soy protein. The moisture retention of a soy protein material may be utilized to decrease cooking loss of moisture in a meat product, providing a yield gain in the cooked weight of the meat. The retained water in the finished food products is also useful for providing a more tender mouthfeel to the product.

Raffinose and stachyose oligosaccharides induce intestinal gas and flatulence in humans, therefore soy protein concentrates and soy protein isolates are processed to remove these compounds. Inexpensive but relatively unprocessed comminuted whole soybeans and soy flours, meals, grits, and flakes contain high levels of carbohydrates, especially raffinose and stachyose. Humans lack the a-galactosidase enzyme needed to break down and digest complex oligosaccharides such as raffinose and stachyose into simple carbohydrates such as glucose, fructose, and sucrose which can be easily absorbed by the gut. Instead of being absorbed by the gut, soy raffinose and stachyose enter the lower intestine where they are fermented by bacteria to cause intestinal gas and flatus. Therefore, soy protein concentrates and soy protein isolates are often preferred as food ingredients over less highly processed soy protein containing materials such as comminuted whole soybeans, soy flours, soy grits, soy meal, and soy flakes.

The most significant drawback to use of soy protein concentrates and isolates as functional food ingredients is their cost, which is directly related to the degree of processing required to provide the high levels of protein and low levels of oligosaccharides desirable in a soy protein material food ingredient. Soy protein concentrates are formed from soy flakes by washing the flakes with either an aqueous alcohol solution or an acidic aqueous solution to remove the water soluble carbohydrates from the protein and fiber. On a commercial scale, the costs associated with handling and disposing the waste stream consisting of the wash containing the soluble carbohydrates are considerable.

Soy protein isolates are even more highly processed, and entail further expense, particularly on a commercial scale. Soy protein isolates are formed by extracting soy protein and water soluble carbohydrates from soy flakes or soy flour with an alkaline aqueous extractant. The aqueous extract, along with the soluble protein and soluble carbohydrates, is separated from materials that are insoluble in the extract, mainly fiber. The extract is then treated with an acid to adjust the pH of the extract to the isoelectric point of the protein to precipitate the protein from the extract. The precipitated protein is separated from the extract, which retains the soluble carbohydrates, and is dried after being adjusted to a neutral pH or is dried without any pH adjustment. On a commercial scale, these steps result in significant costs.

Therefore, in some food ingredient applications relatively unprocessed plant protein materials such as plant flours, plant grits, plant flakes, and plant meal are utilized when possible to reduce costs. Soy flours, soy grits and soy meals are produced from soy flakes by comminuting the flakes to a desired particle size, and heat treating the comminuted materials to inactivate anti-nutritional elements present in soy such a Bowman-Birk and Kunitz trypsin inhibitors. The flakes are typically comminuted by grinding the flakes in grinding and milling equipment such as a hammer mill or an air jet mill. The ground flakes are heat treated with dry heat or steamed with moist heat to "toast" the ground flakes. Heat treating the ground flakes in the presence of significant amounts of water is avoided to prevent denaturation of the soy protein in the material and to avoid costs involved in the addition and removal of water from the soy material.

The resulting ground, heat treated material is a soy flour, soy grit, or a soy meal, depending on the average particle size of the material. The soy flour, grit, or meal typically contains from about 45% to about 55% soy protein, by weight, and also contains substantial amounts of fiber. Conventional soy flours, grits, and meals also contain substantial amounts of oligosaccharides, including raffinose and stachyose, since no steps are taken to remove them.

Conventional soy flours, grits, and meals are used as functional food ingredients to increase viscosity, for fat absorption, for water absorption, and for their emulsification properties, in much the same applications as soy protein concentrates and soy protein isolates. Conventional soy flours, grits, or meals may be further processed for application as meat-like fibers by extruding them with water through a cooker extruder, a process which cooks the soy flour, grit, or meal under pressure in the presence of shear, resulting in substantial denaturation of the soy protein in the material. The substantially denatured soy protein is insoluble in water, and provides the cooked soy flour, grit, or meal with a chewy texture.

Conventional plant flours, grits, and meals, however, are frequently not as effective in food ingredient applications as plant protein concentrates and plant protein isolates due to the reduced content of plant protein in the flours, grits, and meals relative to the concentrates and isolates, and due to the relative lack of functionality of the plant flours, grits, and meals. In certain food ingredient applications, particularly gelling and whipping applications, the relative lack of soy protein content in soy flours, grits, and meals renders them functionally ineffective in the applications, whereas soy protein concentrates and isolates have sufficient soy protein content to be functionally effective.

Conventional soy flours, grits, and meals also have a strong beany, bitter flavor due to volatile compounds in the soy materials such as hexanal, diacetyl, pentanal, n-pentane, and octanal. These flavor notes make soy flours, grits, meal, flakes, and comminuted whole soybeans less attractive as functional food ingredients.

Conventional soy flours, grits, and meals may also be undesirable as functional food ingredients due to their relatively high raffinose and stachyose content. This is particularly true when substantial amounts of the soy flour, grit, or meal are to be utilized in a food application, where the use of the soy flour, grit, or meal could induce intestinal gas, discomfort, and flatus as a result of the raffinose and stachyose oligosachharides present in the materials.

It is desirable, therefore, to obtain an unrefined plant protein material having a protein, fiber, and carbohydrate composition similar to that of a plant flour, plant grit, plant flake, or plant meal which has functionality as a food ingredient similar to a plant protein concentrate or a plant protein isolate, without the attendant expense of processing incurred in producing a plant protein concentrate or isolate. It is particularly desirable to obtain such an unrefined plant protein material from soy, where the unrefined soy protein material has a composition similar to that of a soy flour, soy grit, soy flake, or a soy meal and a functionality similar to soy protein isolate and soy protein concentrate, particularly in emulsified meat and creamed soup applications. It is further desirable to obtain such an unrefined soy protein material which has a low raffinose and stachyose oligosaccharide content, without the attendant expense of processing incurred in producing a soy protein concentrate or a soy protein isolate.

SUMMARY OF THE INVENTION

In one aspect, the present invention is a functional food ingredient comprising an unrefined plant protein material. The unrefined plant protein material forms a gel having a gel weight of at least 30 grams at a temperature of from about 15° C. to about 25° C. in a 5 fluid ounce mixture of 5 parts water per 1 part of unrefined plant protein material, by weight. Preferably the unrefined plant protein material is an unrefined soy protein material.

In another aspect, the present invention is a functional food ingredient comprising an unrefined plant protein material which, when mixed with 5 parts of water per part of unrefined plant protein material, by weight, forms an unrefined plant protein material/water mixture having a refrigerated gel strength of at least 50 grams. Preferably the unrefined plant protein material is an unrefined soy protein material.

In a further aspect, the present invention is a functional food ingredient comprising an unrefined plant protein material in which the unrefined plant protein material has a nitrogen solubility index of from 30% to 80%. The unrefined plant protein material also forms an aqueous slurry having a viscosity of at least 500 centipoise at a temperature of from 15° C. to 25° C. when mixed with 7 parts of water per part of unrefined plant protein material, by weight. Preferably the unrefined plant protein material is an unrefined soy protein material.

In yet another aspect, the present invention is a functional food ingredient comprising an unrefined plant protein material having a nitrogen solubility index of from 30% to 80% and a water hydration capacity of at least 3.75 times the weight of the unrefined plant protein material. Preferably the unrefined plant protein material is an unrefined soy protein material.

In still another aspect, the present invention is a functional food ingredient comprising an unrefined plant protein material having a nitrogen solubility index of from 30% to 80% and a salt tolerance index of from 30% to 80%. Preferably the unrefined plant protein material is an unrefined soy protein material.

In a preferred embodiment of each of the above aspects of the present invention, the unrefined soy protein material contains at most 20 $\mu$mol of raffinose and 35 $\mu$mol of stachyose per gram of the soy material, and the unrefined soy protein material is derived from soybeans from a soybean line having a heritable phenotype of low stachyose content. More preferably, the unrefined soy protein material contains at most 10 $\mu$mol raffinose and 10 $\mu$mol stachyose per gram of the soy material, and most preferably contains at least 200 $\mu$mol of sucrose per gram of the soy material.

In a further preferred embodiment of each of the above aspects of the present invention, the functional food ingredient further comprises sodium tripolyphosphate, sodium acid pyrophosphate, a gum, including guar gum, or a mixture thereof

DESCRIPTION OF THE PREFERRED EMBODIMENT

The composition of the present invention is a functional food ingredient that is an unrefined plant protein material which has physical characteristics that provide the plant protein material with highly effective functionality as a food ingredient. These physical characteristics include: a high gel weight, high gel strength, high viscosity, a nitrogen solubility index of from about 30% to about 80%, a water hydration capacity of at least 4.0, a water activity of 0.3 or less, a moisture content of 6% or less, low trypsin inhibitor and lipoxygenase activity, and preferably low raffinose and low stachyose content. The unrefined plant protein material also contains fiber and carbohydrates, including both water soluble and insoluble carbohydrates.

DEFINITIONS

The present invention applies to a plant protein material, specifically to an unrefined plant protein material useful as a functional food ingredient. As used herein the term "unrefined plant protein material" is defined as a material derived from a plant which contains protein and carbohydrates—both water soluble and water insoluble carbohydrates—where at least 5% of the weight of the material, on a dry basis, is comprised of water soluble carbohydrates. The water soluble carbohydrates which may be present in the unrefined plant protein material include, but are not limited to, fructose, glucose, sucrose, maltose, lactose, stachyose, and raffinose. The water insoluble carbohydrates present in the unrefined plant protein material typically comprise plant fiber, and may include, but are not limited to, polysaccharides, cellulose, hemicelluloses, and pectin.

The "unrefined plant protein material" of the present invention is distinguished from "refined plant protein materials" such as plant protein concentrates and plant protein isolates, at the very least, by the relatively high levels of water soluble carbohydrates present in the unrefined plant protein materials, since refined plant protein materials contain little or no water soluble carbohydrates. The unrefined plant protein material of the present invention may also be distinguished from more refined plant protein materials by its protein content, which is typically less than 65% protein on a dry weight basis, and is usually lower than the relative protein content in a refined plant protein material such as a plant protein isolate or a plant protein concentrate. The unrefined plant protein material of the present invention may also be distinguished from some of the more refined plant protein materials by its fiber content, as some refined plant protein materials are processed to contain no water insoluble fiber.

The unrefined plant protein material is preferably an unrefined soy protein material having physical characteristics that make the unrefined soy protein material useful as a functional food ingredient. The term "unrefined soy protein material" is defined as a soy material which contains protein and carbohydrates, where the soy material contains at least 5% water soluble carbohydrates by weight on a moisture-free basis. The unrefined soy protein material may also contain less than 65% soy protein by weight on a moisture-free basis.

As the present invention is directed primarily toward unrefined soy protein material functional food ingredients, the present invention is described herein with regard to unrefined soy protein materials. Other unrefined plant protein materials, however, can be employed in the present invention in place of unrefined soy protein materials, and the scope of the invention includes plant protein materials other than soy. The plant protein materials may be any unrefined protein material derived from a plant, so long as the unrefined plant protein material has the requisite functionality as specified herein. Representative, but not exclusive, examples of such plant protein materials include pea protein containing materials, lupin containing materials, rapeseed protein containing materials, various legume protein containing materials, and wheat gluten containing materials.

As used herein, the term "soy material" is defined as a material derived from whole soybeans which contains no non-soy derived additives. Such additives may, of course, be added to a soy material to provide further functionality either to the soy material or to a food in which the soy material is utilized as a food ingredient. The term "soybean" refers to the species Glycine max, Glycine soja, or any species that is sexually cross compatible with Glycine max. The term "protein content" as used herein, refers to the relative protein content of a soy material as ascertained by A.O.C.S. (American Oil Chemists Society) Official Methods Bc 4-91(1997), Aa 5-91(1997), or Ba 4d-90(1997), each incorporated herein in its entirety by reference, which determine the total nitrogen content of a soy material sample as ammonia, and the protein content as 6.25 times the total nitrogen content of the sample.

The Nitrogen-Ammonia-Protein Modified Kjeldahl Method of A.O.C.S. Methods Bc4-91 (1997), Aa 5-91 (1997), and Ba 4d-90(1997) used in the determination of the protein content may be performed as follows with a soy material sample. 0.0250–1.750 grams of the soy material are weighed into a standard Kjeldahl flask. A commercially available catalyst mixture of 16.7 grams potassium sulfate, 0.6 grams titanium dioxide, 0.01 grams of copper sulfate, and 0.3 grams of pumice is added to the flask, then 30 milliliters of concentrated sulfuric acid is added to the flask. Boiling stones are added to the mixture, and the sample is digested by heating the sample in a boiling water bath for approximately 45 minutes. The flask should be rotated at least 3 times during the digestion. 300 milliliters of water is added to the sample, and the sample is cooled to room temperature. Standardized 0.5N hydrochloric acid and distilled water are added to a distillate receiving flask sufficient to cover the end of a distillation outlet tube at the bottom of the receiving flask. Sodium hydroxide solution is added to the digestion flask in an amount sufficient to make the digestion solution strongly alkaline. The digestion flask is then immediately connected to the distillation outlet tube, the contents of the digestion flask are thoroughly mixed by shaking, and heat is applied to the digestion flask at about a 7.5-min boil rate until at least 150 milliliters of distillate is collected. The contents of the receiving flask are then titrated with 0.25N sodium hydroxide solution using 3 or 4 drops of methyl red indicator solution—0.1% in ethyl alcohol. A blank determination of all the reagents is conducted simultaneously with the sample and similar in all respects, and correction is made for blank determined on the reagents. The moisture content of the ground sample is determined according to the procedure described below (A.O.C.S Official Method Ba 2a-38). The nitrogen content of the sample is determined according to the formula: Nitrogen (%)= 1400.67×[[(Normality of standard acid)×(Volume of standard acid used for sample (ml))]–[(Volume of standard base needed to titrate 1 ml of standard acid minus volume of standard base needed to titrate reagent blank carried through method and distilled into 1 ml standard acid (ml))× (Normality of standard base)]–[(Volume of standard base used for the sample (ml))×(Normality of standard base)]]/ (Milligrams of sample). The protein content is 6.25 times the nitrogen content of the sample.

The term "soy flour" as used herein means an unrefined soy protein material that is a particulate soy material containing less than 65% soy protein content by weight on a moisture free basis which is formed from dehulled soybeans and which has an average particle size of 150 microns or less. A soy flour may contain fat inherent in soy or may be defatted.

The term "soy grit" as used herein means an unrefined soy protein material that is a particulate soy material containing less than 65% soy protein content by weight on a moisture free basis which is formed from dehulled soybeans and which has an average particle size of from 150 microns to 1000 microns. A soy grit may contain fat inherent in soy or may be defatted.

The term "soy meal" as used herein means an unrefined soy protein material that is a particulate soy material containing less than 65% soy protein content by weight on a moisture free basis which is formed from dehulled soybeans which does not fall within the definition of a soy flour or a soy grit. The term soy meal is intended to be utilized herein as a catchall for particulate soy protein containing materials having less than 65% protein on a moisture free basis which do not fit the definition of a soy flour or a soy grit. A soy meal may contain fat inherent in soy or may be defatted.

The term "soy flakes" as used herein means an unrefined soy protein material that is a flaked soy material containing less than 65% soy protein content by weight on a moisture free basis formed by flaking dehulled soybeans. Soy flakes may contain fat inherent in soy or may be defatted.

The term "comminuted whole soybean material" as used herein refers to a particulate or flaked soy material formed by flaking or grinding whole soybeans, including the hull and germ of the soybeans. A comminuted whole soybean material may contain fat inherent in soy or may be defatted.

The term "weight on a moisture free basis" as used herein refers to the weight of a material after it has been dried to completely remove all moisture, e.g. the moisture content of the material is 0%. Specifically, the weight on a moisture free basis of a soy material can be obtained by weighing the soy material after the soy material has been placed in a 45° C. oven until the soy material reaches a constant weight.

The term "moisture content" as used herein refers to the amount of moisture in a material. The moisture content of a soy material can be determined by A.O.C.S. (American Oil Chemists Society) Method Ba 2a-38 (1997), which is incorporated herein by reference in its entirety. According to the method, the moisture content of a soy material may be measured by passing a 1000 gram sample of the soy material through a 6×6 riffle divider, available from Seedboro Equipment Co., Chicago, Ill., and reducing the sample size to 100 grams. The 100 gram sample is then immediately placed in an airtight container and weighed. 5 grams of the sample are weighed onto a tared moisture dish (minimum 30 gauge, approximately 50×20 millimeters, with a tight-fitting slip cover—available from Sargent-Welch Co.). The dish containing the sample is placed in a forced draft oven and dried at 130±3° C. for 2 hours. The dish is then removed from the oven, covered immediately, and cooled in a dessicator to room temperature. The dish is then weighed. Moisture content is calculated according to the formula: Moisture content (%)=100×[(loss in mass (grams)/mass of sample (grams)].

The term "nitrogen solubility index" as used herein is defined as: (% water soluble nitrogen of a protein containing sample/% total nitrogen in protein containing sample)×100. The nitrogen solubility index provides a measure of the percent of water soluble protein relative to total protein in a protein containing material. The nitrogen solubility index of a soy material is measured in accordance with standard analytical methods, specifically A.O.C.S. Method Ba 11-65, which is incorporated herein by reference in its entirety. According to the Method Ba 11-65, 5 grams of a soy material sample ground fine enough so that at least 95% of the sample will pass through a U.S. grade 100 mesh screen (average particle size of less than about 150 microns) is suspended in 200 milliliters of distilled water, with stirring at 120 rpm, at 30° C. for two hours, and then is diluted to 250 milliliters with additional distilled water. If the soy material is a full-fat material the sample need only be ground fine enough so that at least 80% of the material will pass through a U.S. grade 80 mesh screen (approximately 175 microns), and 90% will pass through a U.S. grade 60 mesh screen (approximately 205 microns). Dry ice should be added to the soy material sample during grinding to prevent denaturation of sample. 40 milliliters of the sample extract is decanted and centrifuged for 10 minutes at 1500 rpm, and an aliquot of the supernatant is analyzed for Kjeldahl protein (PRKR) to determine the percent of water soluble nitrogen in the soy material sample according to A.O.C.S Official Methods Bc 4-91 (1997), Ba 4d-90, or Aa 5-91, as described above. A separate portion of the soy material sample is analyzed for total protein by the PRKR method to determine the total nitrogen in the sample. The resulting values of Percent Water Soluble Nitrogen and Percent Total Nitrogen are utilized in the formula above to calculate the nitrogen solubility index.

The term "salt tolerance index" as used herein is defined as the dispersible nitrogen content (expressed as protein) of a soy material in the presence of salt. The salt tolerance index measures the solubility of protein in the presence of salt. The salt tolerance index is determined according to the following method. 0.75 grams of sodium chloride is weighed and added to a 400 milliliter beaker. 150 milliliters of water at 30±1° C. is added to the beaker, and the salt is dissolved completely in the water. The salt solution is added to a mixing chamber, and 5 grams of a soy material sample is added to the salt solution in the mixing chamber. The sample and salt solution are blended for 5 minutes at 7000 rpm±200 rpm. The resulting slurry is transferred to a 400 milliliter beaker, and 50 milliliters of water is used to rinse the mixing chamber. The 50 milliliter rinse is added to the slurry. The beaker of the slurry is placed in 30° C. water bath and is stirred at 120 rpm for a period of 60 minutes. The contents of the beaker are then quantitatively transferred to a 250 milliliter volumetric flask using deionized water. The slurry is diluted to 250 milliliters with deionized water, and the contents of the flask are mixed thoroughly by inverting the flask several times. 45 milliliters of the slurry are transferred to a 50 milliliter centrifuge tube and the slurry is centrifuged for 10 minutes at 500×g. The supernatant is filtered from the centrifuge tube through filter paper into a 100 milliliter beaker. Protein content analysis is then performed on the filtrate and on the original dry soy material sample according to A.O.C.S Official Methods Bc 4-91 (1997), Ba 4d-90, or Aa 5-91 described above. The salt tolerance index is calculated according to the following formula: STI (%)=(100)×(50)×[(Percent Soluble Protein (in filtrate))/(Percent Total Protein (of dry soy material sample))].

The term "viscosity" as used herein refers to the apparent viscosity of a slurry or a solution as measured with a rotating spindle viscometer utilizing a large annulus, where a particularly preferred rotating spindle viscometer is a Brookfield viscometer. The apparent viscosity of a soy material is measured by weighing a sample of the soy material and water to obtain a known ratio of the soy material to water (preferably 1 part soy material to 7 parts water, by weight), combining and mixing the soy material and water in a blender or mixer to form a homogenous slurry of the soy material and water, and measuring the apparent viscosity of the slurry with the rotating spindle viscometer utilizing a large annulus.

The term "water hydration capacity" as used herein is defined as the maximum amount of water a material can absorb and retain under low speed centrifugation (2000×g).

The water hydration capacity of a soy material is determined by: 1) weighing a soy material sample; 2) measuring the moisture content of the sample according to A.O.C.S Method Ba 2a-38 described above; 3) determining the approximate water hydration capacity of the soy material sample by adding increments of water to the sample in a centrifuge tube until the sample is thoroughly wetted, centrifuging the wetted sample at 2000×g, decanting excess water, re-weighing the sample, and calculating the approximate water hydration capacity as the weight of the hydrated sample minus the weight of the unhydrated sample divided by the weight of the unhydrated sample; 4) preparing four samples of the soy material having the same weight as the unhydrated soy material sample determined in step 1 and having volumes of water calculated to encompass the approximate water hydration capacity value, where the volumes of water in milliliters are determined according to the formula: (approximate water hydration capacity×weight of the unhydrated sample in step 1)+Y, where Y=−1.5, −0.5, 0.5, and 1.5 for the respective four samples; 5) centrifuging the four samples and determining which two of the four samples encompass the water hydration capacity—one sample will have a small excess of water, and the other will have no excess water; and 6) calculating the water hydration capacity according to the formula: Water Hydration Capacity (%)=100×[(Volume of water added to the sample with excess water+Volume of water added to the sample with no excess water)]/[(2)×(Solids content of the soy material)]. The solids content of the soy material used in calculating the water hydration capacity is determined according to the formula: Solids content (%)=(Weight of the soy material sample measured in step 1)×[1.0−(Moisture content of the soy material measured in step 2/100)].

The term "water activity" as used herein is a measure of the unbound, free water in a soy protein containing material available to support biological and chemical reactions, particularly bacterial growth and enzymatic reactions. In a soy protein containing material not all water, or moisture content, is available to support biological and chemical reactions since a portion of the water is bound to the protein and other molecules such as carbohydrates. The water activity of the soy material is a measure of how much bacterial growth and enzymatic activity the soy material is likely to support. Water activity, as defined herein, is measured using a chilled-mirror dewpoint technique. A sample of soy material is placed in a cup of limited headspace at room temperature. The cup is inserted into a sample chamber in an analytical instrument, preferably an AquaLab CX2 available from Decagon Devices in Washington D.C., which equilibrates the vaporization of moisture from the sample onto a mirror in the chamber by repeatedly heating and cooling the sample in the sample chamber. The instrument measures the temperature and water activity each time dew forms on the mirror, until a final water activity is determined when the water activity readings are less than 0.001 apart.

The term "refrigerated gel strength" as used herein is a measure of the strength of a gel of a soy material following refrigeration at −5° C. to 5° C. for a period of time sufficient for the gel to equilibrate to the refrigeration temperature. Refrigerated gel strength is measured by mixing a sample of soy material and water having a 1:5 soy material:water ratio, by weight (including the moisture content of the soy material in the water weight) for a period of time sufficient to permit the formation of a gel; filling a 3 piece 307×113 millimeter aluminum can with the gel and sealing the can with a lid; refrigerating the can for a period of 16 to 24 hours at a temperature of −5° C. to 5° C.; opening the can and separating the refrigerated gel from the can, leaving the gel sitting on the can bottom; measuring the strength of the gel with an instrument which drives a probe into the gel until the gel breaks and measures the break point of the gel (preferably an Instron Universal Testing Instrument Model No. 1122 with 36 mm disk probe); and calculating the gel strength from the recorded break point of the gel. The calculation of the gel strength is made according to the following formula: Gel Strength (grams)=(454)(Full Scale Load of the instrument required to break the gel)×(recorded break point of the gel (in instrument chart units out of a possible 100 chart units))/100.

As used herein, the term "gel weight" refers to the amount of gel formed by one part soy material upon being mixed with five parts water, as measured by the weight of the resulting gel from five fluid ounces of mixed soy material/water at a temperature of 15° C. to 25° C. The gel weight of a soy material is measured by mixing one part of soy material, by weight, with five parts of water, by weight, and thoroughly blending the soy material in the water. A five fluid ounce cup is completely filled with the slurry of soy material and water, and any excess slurry is scraped off of the cup. The cup is tipped over on its side so that any non-gel material may spill out of the cup. After five minutes, any excess slurry material extending outside the lip of the cup is cut off, and the amount of the slurry remaining in the cup is weighed to give the gel weight.

As used herein, the term "trypsin inhibitor activity" refers to the activity of soy material components in inhibiting trypsin activity as measured trypsin inhibition units (TIU). Trypsin inhibitor activity of a soy material may be measured according to A.O.C.S. Official Method Ba 12-75 (1997), incorporated herein in its entirety by reference. According to the method, 1 gram of soy material is mixed with 50 milliliters of 0.01 N aqueous sodium hydroxide solution for a period of 3 hours to extract the trypsin inhibiting components from the soy material. An aliquot of the extract suspension is diluted until the absorbance of a 1 milliliter aliquot assay at 410 nm is between 0.4 and 0.6 times the absorbance of a 0 milliliter assay (blank). 0, 0.6, 1.0, 1.4, and 1.8 milliliter aliquots of the diluted suspension are added to duplicate sets of test tubes, and sufficient water is added to bring the volume in each test tube to 20 milliliters. 2 milliliters of trypsin solution is mixed in each tube and incubated for several minutes to allow the trypsin inhibiting factors to react with the added trypsin. A 5 milliliter aliquot of benzoyl-D,L-arginine-p-nitroanilide (BAPNA) solution, commercially available from Sigma Chemical Company, St. Louis, Mo., is then added to each tube. Uninhibited trypsin catalyzes the hydrolysis of BAPNA, forming yellow-colored p-nitroaniline. A blank is also prepared of 2 milliliters of the dilute suspension and 5 milliliters of BAPNA. After exactly ten minutes of reaction, the hydrolysis of the diluted suspensions and the blank is halted by adding 1 milliliter of acetic acid. 2 milliliters of trypsin solution is then added to the blank and mixed therein. The contents of each tube and the blank are filtered through filter paper, and are centrifuged for 5 minutes at 10,000 rpm. The yellow supernatant solutions are measured spectrophotometrically for absorbance at 410 nm. Trypsin inhibitor activity is evaluated from the difference in degree of BAPNA hydrolysis between the blank and the samples, where one TIU is defined as an increase equal to 0.01 absorbance units at 410 nm after 10 minutes of reaction per 10 milliliters of final reaction volume. Trypsin inhibitor units per milliliters of diluted sample suspension may be calculated according to the formula: TIU/ml=100×[(absorbance of the blank)−

(absorbance of the sample solution)]/(number of milliliters of diluted sample suspension used in the assay).

The term "line" as used herein refers to a group of plants of similar parentage that display little or no genetic variation between individuals for at least one trait. Such lines may be created by one or more generations of self-pollination and selection, or vegetative propagation from a single parent including by tissue or cell culture techniques. "Mutation" refers to a detectable and heritable genetic change (either spontaneous or induced) not caused by segregation or genetic recombination. "Mutant" refers to an individual, or lineage of individuals, possessing a mutation.

The term "nucleic acid" refers to a large molecule which can be single-stranded or double-stranded, comprised of monomers (nucleotides) containing a sugar, a phosphate, and either a purine or a pyrimidine. A "nucleic acid fragment" is a fraction of a given nucleic acid molecule. "Complementary" refers to the specific pairing of purine and pyrimidine bases that comprise nucleic acids: adenine pairs with thymine and guanine pairs with cytosine. Thus, the "complement" of a first nucleic acid fragment refers to a second nucleic acid fragment whose sequence of nucleotides is complementary to the first nucleic acid sequence.

In higher plants, deoxyribonucleic acid (DNA) is the genetic material while ribonucleic acid (RNA) is involved in the transfer of information from DNA into proteins. A "genome" is the entire body of genetic material contained in each cell of an organism. The term "nucleotide sequence" refers to the sequence of DNA or RNA polymers, which can be single- or double-stranded, optionally containing synthetic, non-natural or altered nucleotide bases capable of incorporation into DNA or RNA polymers.

"Gene" refers to a nucleic acid fragment that expresses a specific protein, including regulatory sequences preceding (5' non-coding) and following (3' non-coding) the coding region. "RNA transcript" refers to the product resulting from RNA polymerase-catalyzed transcription of a DNA sequence. "Antisense RNA" refers to an RNA transcript that is complementary to all or part of an RNA transcript that is complementary to all or part of a primary target transcript and that blocks the expression of a target gene by interfering with the processing, transport, and/or translation of its primary transcript. The complementary of an antisense RNA may be with any part of the specific gene transcript, i.e, at the 5' non-coding sequence, 3' non-coding sequence, introns, or the coding sequence. "Antisense inhibition" refers to the production of antisense RNA transcripts capable of preventing the expression of the target protein. "Cosuppression" refers to the expression of a foreign gene which has substantial homology to an endogenous target gene resulting in the suppression of expression of both the foreign and the endogenous gene.

"Promoter" refers to a DNA sequence in a gene, usually upstream (5') to its coding sequence, which controls the expression of the coding sequence by providing the recognition for RNA polymerase and other transcription factors. Promoters may also contain DNA sequences that are involved in the binding of protein factors which control the effectiveness of transcription initiation in response to physiological or developmental conditions.

"Raffinose saccharides" refers to the family of oligosaccharides with the general formula O-β-D-galactopyranosyl-(1-6)$_n$-α-glucopyranosyl-(1-2)-β-D-fructofuranoside where n=1 to 4. In soybean seeds, the term refers more specifically to the members of the family containing one (raffinose) and two (stachyose) galactose residues. Although higher galactose polymers are known (e.g. verbascose and ajugose), the content of these higher polymers in soybean is below standard methods of detection and therefore do not contribute significantly to total raffinose saccharide content.

Novel Soy Material Useful As or In a Food Ingredient Composition

The soy material of the functional food ingredient composition of the present invention is an unrefined soy protein material. Unlike more refined soy protein materials, the unrefined soy protein material of the present invention contains significant amounts of water-soluble carbohydrates, in addition to soy protein and fiber. The unrefined soy protein material of the present invention contains at least 5% water-soluble carbohydrates by weight on a moisture-free basis.

Typically the unrefined soy protein material will have a soy protein content of less than 65% by weight on a moisture-free basis—less than that of refined soy materials such as soy protein concentrates and soy protein isolates. The unrefined soy protein material may have a soy protein content of 65% or greater by weight on a moisture-free basis provided that the unrefined soy protein material is derived from soybeans of a soybean line having a phenotype of high storage protein content. The unrefined soy protein material of the present invention, however, has similar functionality as a food ingredient as the more highly processed soy protein concentrates and soy protein isolates without a protein content of 65% or greater on a moisture-free basis.

The unrefined soy material preferably contains less than 65% soy protein by weight on a moisture-free basis, and may contain less than 60% soy protein or less than 55% soy protein by weight on a moisture-free basis, depending on the starting material used to produce the soy material. For example, the unrefined soy protein material may be a comminuted whole soybean material that contains soy hulls and soy germ that has a relatively low soy protein content. Preferably the unrefined soy protein material has a protein content of at least 20% soy protein by weight on a moisture-free basis, and more preferably contains at least 25% soy protein by weight on a moisture-free basis. Particularly preferred unrefined soy protein materials are soy flours, soy grits, soy meal, and soy flakes that have been treated to provide the desired functionality for use as a food ingredient.

The soy material of the functional food ingredient composition of the present invention may contain quantities of a refined soy protein material such as a soy protein isolate or a soy protein concentrate mixed with the unrefined soy protein material to raise the concentration of protein in the soy material above 65% by weight, on a moisture free basis. It is preferred, however, that the unrefined soy protein material by utilized as the sole source of soy protein in the soy material of the functional food ingredient composition to minimize the commercial production costs of the soy material.

The unrefined soy protein material of the functional food ingredient of the present invention contains significant amounts of partially denatured soy protein, which provides substantial functionality to the soy material. Soy protein in its native state is a globular protein having a hydrophobic core surrounded by a hydrophilic shell. Native soy protein is very soluble in water due to its hydrophilic shell. The partially denatured soy proteins in the unrefined soy protein material of the present invention have been partially unfolded and realigned so that hydrophobic and hydrophilic portions of adjacent proteins may overlap. The partially denatured soy proteins, however, have not been denatured to such an extent that the proteins are rendered insoluble in an aqueous solution. In an aqueous solution, the partially denatured soy proteins of the soy material form large aggregates wherein the exposed hydrophobic portions of the partially denatured proteins are aligned with each other to reduce exposure of the hydrophobic portions to the solution. These aggregates promote the formation of gels, increase gel strength, and increase viscosity of the soy material.

The degree of denaturation of the soy protein in the unrefined soy protein material is measurable, in part, by the solubility of the protein in an aqueous solution, which is related to the nitrogen solubility index of the unrefined soy protein material. Soy materials containing highly aqueous-soluble soy protein have a nitrogen solubility index of greater than 80%, while soy materials containing large quantities of aqueous-insoluble soy protein have a nitrogen solubility index less than 25%. The unrefined soy protein material of the food ingredient composition of the present invention has a nitrogen solubility index of from about 30% to about 80%. More preferably, the unrefined soy protein material has a nitrogen solubility index of from about 35% to about 75%, and most preferably from about 40% to about 70%.

The soy proteins in the unrefined soy protein material of the functional food ingredient of the present invention retain their partial solubility in an aqueous system containing salt (sodium chloride). This is a particularly important feature of the unrefined soy protein material of the functional food ingredient of the invention, since the unrefined soy protein material is useful as a food ingredient in food systems containing significant amounts of salt. In an aqueous system, soluble or partially soluble soy protein has a tendency to become insoluble or "salts out" when a significant amount of salt is added to the aqueous system. In food systems that contain relatively high amounts of salt, such as emulsified meats or soups, insoluble soy protein caused by "salting out" is highly undesirable.

The unrefined soy protein material of the food ingredient of the present invention contains soy protein that is not significantly susceptible to "salting out". The unrefined soy protein material of the present invention has a salt tolerance index, a measure of protein solubility comparable to the nitrogen solubility index which is measured in a salt containing system, of from 30% to 80%. More preferably, the unrefined soy protein material of the food ingredient of the present invention has a salt tolerance index of from about 35% to about 75%, and most preferably from about 40% to about 70%.

The unrefined soy protein material of the food ingredient of the present invention is capable of forming a substantial gel in an aqueous solution due, in part, to the aggregation of the partially denatured proteins of the unrefined soy protein material. Substantial gel formation in an aqueous environment is a desirable quality of the food ingredient composition of the present invention since the gelling properties of the unrefined soy protein material contribute to the texture and structure of meat products in which the unrefined soy protein material is used, as well as provide a matrix for retaining moisture and fats in the meat products to enable a cooked meat product containing the unrefined soy protein material to retain its juices during cooking.

The extent to which the unrefined soy protein material of the food ingredient composition of the present invention forms a gel in an aqueous solution may be quantified by the gel weight of a gel formed by the unrefined soy protein material in water. Preferably the unrefined soy protein material has a gel weight of at least 30 grams at a temperature of from about 15° C. to about 25° C. in a 5 fluid ounce mixture of five parts water to one part unrefined soy protein material, by weight. More preferably, a five fluid ounce mixture of the unrefined soy protein material and water at a 1:5 ratio, by weight, has a gel weight of at least 50 grams at a temperature of from about 15° C. to about 25° C., and most preferably has a gel weight of at least 100 grams at a temperature of from about 15° C. to about 25° C.

The unrefined soy protein material of the food ingredient of the present invention is also capable of forming a gel that has significant refrigerated gel strength and pasteurized gel strength. The gel strength of the unrefined soy protein material is important to enable the food ingredient composition to provide a firm structure to a meat emulsion. Meat emulsions used to form meat products such as frankfurters, sausages, and luncheon meats are formed with deboned meats and fats which have little inherent structure, and soy protein containing materials which form strong gels are used to give the meat emulsion a desirable firm texture.

The unrefined soy protein material of the food ingredient of the present invention is capable of forming a gel of sufficient gel strength so the unrefined soy protein material can be utilized in a meat emulsion to provide a meat emulsion having a firm texture. The unrefined soy protein material has a refrigerated gel strength of at least 50 grams when combined with five parts of water per one part of the unrefined soy protein material. More preferably, the unrefined soy protein material has a refrigerated gel strength in a 5:1 water:soy material mixture of at least 100 grams, and most preferably has a refrigerated gel strength of at least 200 grams in a 5:1 water:soy material mixture. The unrefined soy protein material has a pasteurized gel strength of at least 500 grams in a 5:1 water:soy material mixture, and most preferably has a pasteurized gel strength of at least 700 grams in such a mixture.

The unrefined soy protein material of the food ingredient composition of the present invention is also capable of providing significant viscosity to an aqueous based solution. The relatively high viscosity of the unrefined soy protein material is due in part to the aggregation of the partially denatured soy protein of the unrefined soy protein material, and also in part to the water hydration capacity of the unrefined soy protein material. The high viscosity characteristics of the unrefined soy protein material in an aqueous medium promote and are associated with gel formation, which as described above, is desirable, particularly for use in meat applications. The high viscosity of the unrefined soy protein material in an aqueous system also enables the food ingredient to be utilized as a thickening agent in gravies, yogurts, and soups, especially creamed soups, and to be used in baking applications. An aqueous solution containing 12.5% of the unrefined soy protein material of the food ingredient composition by weight (7 parts water: 1 part soy material) has a viscosity of at least 500 centipoise at a temperature of 15° C. to 25° C. More preferably, an aqueous solution containing 12.5% of the unrefined soy protein material by weight has a viscosity of at least 1000 centipoise at a temperature of 15° C. to 25° C., and most preferably has a viscosity of at least 1500 centipoise at a temperature of 15° C. to 25° C.

The unrefined soy protein material of the food ingredient composition of the present invention also has a substantial water hydration capacity. Water hydration capacity, a direct measure of the ability of a material to absorb and retain moisture, is desirable in a food ingredient utilized in meat emulsions since a material having a relatively high water hydration capacity absorbs and retains moisture released by meat materials upon cooking, thereby retaining the juices of the cooked meat and providing improved weight retention of the meat emulsion in the cooking process. Incorporation of the unrefined soy protein material in a meat emulsion, therefore, leads to improved taste and tenderness of the cooked meat emulsion and an improved cooked weight yield relative to cooked meat emulsions which do not contain a food ingredient with a high water hydration capacity.

The relatively high water hydration capacity of the unrefined soy protein material of the food ingredient of the present invention is believed to be due to enhanced water hydration capacity of fiber in the unrefined soy protein material relative to fiber in conventional unrefined soy protein materials, as well as to the partial denaturation of the soy protein in the unrefined soy protein material of the food ingredient of the present invention. The process of forming the unrefined soy protein material, as described hereinafter, exposes the soy material to relatively high temperatures which expands fiber and denatures protein in the unrefined soy protein material in the presence of water. The unrefined soy protein material is dried rapidly, which causes the fiber to retain its expanded structure and the protein to retain its denatured structure. Upon addition of the unrefined soy protein material to an aqueous system, the expanded fiber and the denatured protein absorb substantial amounts of water, resulting in the relatively high water hydration capacity of the unrefined soy protein material. Preferably, the unrefined soy protein material has a water hydration capacity of at least 3.75 times the weight of the unrefined soy protein material, and more preferably at least four times the weight of the unrefined soy protein material.

The unrefined soy protein material of the food ingredient composition of the present invention further has a relatively low water activity. Water activity indicates the amount of moisture in a material that is available to support biological activity, such as microbial growth and enzymatic activity. Microbial growth is undesirable in a food ingredient since it leads to spoilage, and shortens the shelf-life of the food ingredient. Enzymatic activity is also undesirable in a soy material food ingredient, particularly activity by lipoxygenase enzymes and trypsin inhibitor enzymes. Lipoxygenase enzymes oxidize polyunsaturated acids, which in turn undergo further reactions to form undesirable flavors in soy materials. Trypsin inhibitors are anti-nutritive factors present in soy materials which inhibit the activity of trypsin, and have been associated with growth inhibition and hyperactive pancreatic activity.

The unrefined soy protein material of the functional food ingredient of the present invention has a low water activity for supporting such biological activity, preferably having a water activity of 0.3 or less, and more preferably having a water activity of 0.2 or less. It is believed that the low water activity of the unrefined soy protein material is due to the low moisture content of the unrefined soy protein material and to the structural change and realignment of the soy proteins in the unrefined soy protein material in the processing of the soy material. The soy proteins are structurally changed from a globular form to an unfolded form by heating the proteins in the presence of water. As the proteins are unfolded, unbound water is expelled from the proteins, and the proteins realign into aggregates which share overlapping hydrophilic and hydrophobic subunits, reducing the water activity of the proteins. Rapid drying of the resulting aggregated partially denatured proteins prevents the proteins from adopting a conformation more amenable to accepting unbound water so the unrefined soy protein material retains its low water activity.

The unrefined soy protein material of the food ingredient composition of the present invention also has low trypsin inhibitor activity. As noted above, soy materials contain trypsin inhibitors, which are anti-nutritive factors that inhibit the activity of trypsin and are associated with hyperactive pancreatic activity and growth inhibition. Trypsin inhibitors are proteins with enzymatic activity, and are denatured in the unrefined soy protein material of the present invention by heating the trypsin inhibitors in the presence of water in the same manner as the soy protein in the soy material is denatured. The denatured trypsin inhibitors are ineffective enzymatically since the inhibitors have been denatured from their enzymatically active conformation. It is believed that the trypsin inhibitor activity of the unrefined soy protein material of the present invention is lower than that of conventional soy flours, soy grits, and soy meals as a result of denaturing the trypsin inhibitors in the presence of significant amounts of water rather than merely applying moist heat. The unrefined soy protein material of the food ingredient composition of the present invention preferably has a trypsin inhibitor activity of at most 10 trypsin inhibitor units per milligram of soy material.

Preferably, the unrefined soy protein material of the food ingredient composition of the present invention also has low lipoxygenase activity. Soybeans contain lipoxygenase enzymes which, as noted above, oxidize polyunsaturated acids which then undergo further reactions to form compounds that give soy materials an undesirable flavor. In addition to the low water activity of the unrefined soy protein material, which limits lipoxygenase activity, the lipoxygenase activity in the unrefined soy protein material is limited as a result of inactivation of lipoxygenase enzymes in the processing of the soy material. As noted above, the unrefined soy protein material is processed by heating the soy material in water to partially denature the soy protein, also denaturing lipoxygenase enzymes present in the soy material. The denatured lipoxygenase enzymes are inactive, and do not oxidize polyunsaturated acids to produce undesirable flavor compounds.

Furthermore, the unrefined soy protein material of the functional food ingredient composition of the present invention preferably has a low moisture content. A low moisture content is desirable to increase the shelf-life of a food containing the unrefined soy protein material since less moisture in the soy material provides less support for microbial growth, decreasing the microbial load introduced by the food ingredient into the food which may cause the food to spoil. The unrefined soy protein material of the functional food ingredient of the present invention preferably has a moisture content of less than 6%, by weight, and more preferably less than 5% by weight.

The unrefined soy protein material of the functional food ingredient composition of the present invention also preferably has low concentrations of volatile components which give conventional soy flours and grits poor flavor, particularly a beany and/or bitter flavor. Specifically, the unrefined soy protein material of the functional food ingredient of the present invention has low concentrations of n-pentane, diacetyl, pentanal, hexanal, 2-heptanone, 2-pentyl furan, and octanal. Preferably the unrefined soy protein material contains less than 20 parts per million ("ppm") of n-pentane, less than 50 ppm diacetyl, less than 50 ppm pentanal, less than 650 ppm hexanal, less than 10 ppm 2-heptanone, less than 10 ppm 2-pentyl furan, and less than 10 ppm octanal.

In a particularly preferred embodiment, the unrefined soy protein material of the food ingredient of the present invention contains low amounts of raffinose and stachyose oligosaccharides. As noted above, raffinose and stachyose are indigestible oligosaccharides present in soy which are fermented in the human intestine, causing intestinal gas and resulting intestinal discomfort and flatus. The low raffinose, low stachyose unrefined soy protein material is used in the food ingredient composition of the present invention to reduce or prevent production of intestinal gas and flatus upon consumption of a food containing the food ingredient relative to foods containing food ingredients which utilize conventional soy flours, grits, meals, or flakes. In a particularly preferred embodiment, the low raffinose, low stachyose unrefined soy protein material is derived from soybeans from a soybean line having a heritable phenotype of low stachyose content.

As used herein, a "low raffinose" soy material is a soy material which contains at most 20 μmol raffinose per gram of soy material, more preferably at most 10 μmol raffinose per gram of soy material, and most preferably at most 5 μmol raffinose per gram of soy material. The low raffinose soy material preferably inherently contains such low levels of raffinose without processing to remove the raffinose. As used herein a "low stachyose" soy material is a soy material which contains at most 35 μmol stachyose per gram of soy material, more preferably at most 10 μmol stachyose per gram of soy material, and most preferably at most 5 μmol stachyose per gram of soy material. The low stachyose soy material preferably inherently contains such low levels of stachyose without processing to remove the stachyose.

More preferably, the low raffinose, low stachyose unrefined soy protein material also contains a high sucrose content to provide additional taste and functionality to the unrefined soy protein material. As used herein, a "high sucrose" soy material is a soy material which inherently contains at least 200 μmol/gram of sucrose, and more preferably contains at least 210 μmol/gram of sucrose.

The unrefined soy protein material of the food ingredient composition of the present invention may also contain other selected traits which improve the flavor, appearance, or functionality of the soy material. These traits may be present in the unrefined soy protein material alone or together with the low raffinose, low stachyose, and/or high sucrose traits, or in combination with other preferred traits. These traits include: low lipoxygenase content (to enhance flavor); modified seed storage content (for varied nutritional profiles); low phytic acid and phytate content (to enhance nutritional profile); yellow hylum content (to enhance appearance); and enhanced isoflavone content (to provide health benefits).

The food ingredient composition of the present invention may also contain materials to enhance the functionality and flow characteristics of the unrefined soy protein material. In a preferred embodiment, the functional food ingredient contains sodium tripolyphosphate ("STPP"). STPP interacts with amine groups of soy proteins in the unrefined soy protein material, and promotes solubility of the denatured soy proteins in an aqueous solution, thereby enhancing the gel and emulsion forming capability of the unrefined soy protein material. STPP also has a chelating effect which may slow or prevent undesirable oxidative reactions. In a particularly preferred embodiment, the food ingredient composition contains less than about 3% by weight of STPP. Sodium acid pyrophosphate ("SAPP"), trisodium phosphate, and gums, preferably guar gum, may also be included in the food ingredient composition in amounts less than 5%, by weight, of the food ingredient composition to modify the flow characteristics of the composition.

In a preferred embodiment, therefore, the functional food ingredient of the present invention is an unrefined soy protein material having a soy protein content of less than 65% by weight on a moisture free basis, more preferably less than 60% and more than 20%, which has a nitrogen solubility index of from about 30% to about 80%, more preferably from 35% to 75%, and most preferably from 40% to 70%, and which has at least one of the following characteristics: a viscosity of at least 500 centipoise, more preferably at least 1000 centipoise and most preferably at least 1500 centipoise, at a temperature of from 18° C. to 25° C.; a water hydration capacity of at least 3.75 times the weight of the unrefined soy protein material; a water activity of 0.3 or less, and more preferably 0.2 or less; a salt tolerance index of from about 30% to about 80%, more preferably from about 35% to about 75%, and most preferably from about 40% to about 70%; or a trypsin inhibitor activity of at most 10 TIU per milligram of the unrefined soy protein material. Preferably the food ingredient has a refrigerated gel strength of at least 50 grams when the unrefined soy protein material is combined with five parts of water per part of soy material, by weight, and more preferably has a refrigerated gel strength of at least 100 grams, and most preferably has a refrigerated gel strength of at least 200 grams. Further, the food ingredient preferably has a gel weight of at least 30 grams at a temperature of about 15° C. to about 25° C., more preferably at least 50 grams, and most preferably at least 100 grams. More preferably the unrefined soy protein material of the food ingredient has a moisture content of less than 6%, by weight, and more preferably at most 5%, by weight; and contains less than 20 ppm n-pentane, 50 ppm diacetyl, 650 ppm hexanal, 10 ppm 2-heptanone, 10 ppm 2-pentyl furan, and 10 ppm octanal. In a most preferred embodiment the unrefined soy protein material is a low raffinose, low stachyose soy material derived from soybeans from a soybean line having a heritable phenotype of low stachyose content. Preferably the food ingredient also contains at least one additive selected from sodium tripolyphosphate, sodium acid pyrophosphate, and a gum.

In another preferred embodiment, the functional food ingredient of the present invention is an unrefined soy protein material containing less than 65% soy protein by weight on a moisture free basis, more preferably less than 60% and more than 20%, having at least one of the following characteristics: a gel weight of at least 30 grams at a temperature of about 15° C. to about 25° C., more preferably at least 50 grams, and most preferably at least 100 grams; or a refrigerated gel strength of at least 50 grams when the unrefined soy protein material is combined with five parts of water per part of soy material, by weight, and more preferably at least 100 grams, and most preferably at least 200 grams. The unrefined soy protein material of the functional food ingredient also preferably has at least one of the following characteristics: a nitrogen solubility index of from 30% to 80%, more preferably from 35% to 75%, and most preferably from 40% to 70%; a salt tolerance index of from 30% to 80%, more preferably from 35% to 75%, and most preferably from 40% to 70%; a viscosity of at least 500 centipoise, more preferably at least 1000 centipoise and most preferably at least 1500 centipoise, at a temperature of from 18° C. to 25° C.; a water hydration capacity of at least 3.75 times the weight of the soy material; a water activity of 0.3 or less, and more preferably 0.2 or less; or a trypsin inhibitor activity of at most 10 TIU per milligram of the soy material. The unrefined soy protein material of the functional food ingredient also preferably has a moisture content of less than 6%, by weight, more preferably less than 5%, by weight; and contains less than 20 ppm n-pentane, 50 ppm diacetyl, 50 ppm pentanal, 650 ppm hexanal, 10 ppm 2-heptanone, 10 ppm 2-pentyl furan, and 10 ppm octanal. In a most preferred embodiment the unrefined soy protein material is a low raffinose, low stachyose soy material derived from soybeans from a soybean line having a heritable phenotype of low stachyose content. Preferably the food ingredient also contains at least one additive selected from sodium tripolyphosphate, sodium acid pyrophosphate, and a gum.

Processes for Preparing Novel Soy Material

The present invention is also directed to processes for preparing the novel unrefined plant protein material utilized in the food ingredient composition of the invention. In a first embodiment, an unrefined soy protein material is hydrated, where at least two parts of water are added per one part of unrefined soy protein material to hydrate the soy material. At least a portion of soy protein contained in the hydrated unrefined soy protein material is irreversibly partially denatured, and the soy material is dried so that the unrefined soy protein material has a nitrogen solubility index of from about 30% to about 80%.

The soy material utilized as a starting material in the process may be any unrefined soy protein material containing soy protein, fiber, and carbohydrates, where water soluble carbohydrates comprise at least 5% by weight of the unrefined soy protein material on a dry weight basis. Preferably the unrefined soy protein material contains less than 65% soy protein on a moisture-free basis, more preferably containing less than 60% soy protein, and preferably containing more than 20% soy protein, and most preferably more than 25% soy protein. The unrefined soy protein material used as the starting material includes, but is not limited to, soy protein containing materials such as comminuted whole soybeans, soy flours, soy grits, soy flakes, and soy meals. Most preferably, the unrefined soy protein material used as a starting material for the process is a defatted soy flour, defatted soy grit, defatted soy meal, or defatted soy flake material. Such unrefined soy protein materials may be produced from whole soybeans, as described below, or are available commercially.

Soy flakes for use in the process of the invention may be produced from whole soybeans by detrashing the soybeans; cracking the hulls of the detrashed soybeans; dehulling the soybeans; separating the cotyledonous portion of the dehulled soybeans from the hypocotyls, if desired; flaking the cotyledonous portion of the soybeans; and defatting the resulting soy flakes, if desired. All of the steps in forming the soy flakes may be performed according to conventional processes in the art for forming soy flakes with conventional equipment.

The soybeans may be detrashed by passing the soybeans through a magnetic separator to remove iron, steel, and other magnetically susceptible objects, followed by shaking the soybeans on progressively smaller meshed screens to remove soil residues, pods, stems, weed seeds, undersized beans, and other trash. The detrashed soybeans may be cracked by passing the soybeans through cracking rolls. Cracking rolls are spiral-cut corrugated cylinders which loosen the hull as the soybeans pass through the rolls and crack the soybean material into several pieces. Preferably the cracked soybeans are conditioned to 10% to 11% moisture at 63 to 74° C. to improve the storage quality retention of the soybean material. The cracked soybeans may be dehulled by aspiration. The hypocotyls, which are much smaller than the cotyledons of the soybeans, may be removed by shaking the dehulled soybeans on a screen of sufficiently small mesh size to remove the hypocotyls and retain the cotyledons of the beans. The hypocotyls need not be removed since they comprise only about 2%, by weight, of the soybeans while the cotyledons comprise about 90% of the soybeans by weight, however, it is preferred to remove the hypocotyls since they are associated with the beany taste of soybeans. The dehulled soybeans, with or without hypocotyls, are then flaked by passing the soybeans through flaking rolls. The flaking rolls are smooth cylindrical rolls positioned to form flakes of the soybeans as they pass through the rolls having a thickness of from about 0.01 inch to to about 0.015 inch.

The flakes may then be defatted, if a defatted soy material is desired, may be partially defatted, or the defatting step may be excluded if a full fat soy material is desired. The soy flakes, and any soy materials produced therefrom such as a soy flour, a soy grit, or a soy meal, therefore, may range from fully defatted to full fat soy materials. Preferably the flakes are defatted for use in the functional food ingredient of the present invention to insure good keeping qualities of the final product and to permit proper processing of the soy material of the composition.

The flakes may be defatted by extracting the flakes with a suitable solvent to remove the oil from the flakes. Preferably the flakes are extracted with n-hexane or n-heptane in a countercurrent extraction. The defatted flakes should contain less than 1.5% fat or oil content by weight, and preferably less than 0.75%. The solvent-extracted defatted flakes are then desolventized to remove any residual solvent using conventional desolventizing methods, including desolventizing with a flash desolventizer-deodorizer stripper, a vapor desolventizer-vacuum deodorizer, or desolventizing by down-draft desolventization. Alternatively, the flakes may be defatted by a conventional mechanical expeller rather than by solvent extraction.

Preferably, the defatted flakes are then comminuted into a soy flour or a soy grit for use as the starting material of the process. The flakes are comminuted by grinding the flakes to the desired particle size using conventional milling and grinding equipment such as a hammer mill or an air jet mill. Soy flour has a particle size wherein at least 97%, by weight, of the flour has a particle size of 150 microns or less (is capable of passing through a No. 100 mesh U.S. Standard Screen). Soy grits, more coarsely ground than soy flour, are ground to an average particle size of from 150 microns to 1000 microns.

Although dehulled and degermed soy materials are preferred as the starting material in the process of the invention, comminuted whole soybeans including the hull and the hypocotyl (germ) may also be used in the process if desired. Whole soybeans are detrashed as described above, and then are comminuted by grinding the detrashed soybeans using conventional milling and grinding equipment such as a hammer mill or an air jet mill. Alternatively, the whole soybeans may be dehulled and ground, either with or without the hypocotyl, into a soy flour or a soy grit without first flaking the soybeans.

In a particularly preferred embodiment, the soy material used as the starting material of the process of the present invention is a low raffinose, low stachyose soy material, where the low raffinose, low stachyose soy material is derived from soybeans from a soybean line having a heritable phenotype of low stachyose content. Most preferably the low raffinose, low stachyose soybeans also have a high sucrose content of at least 200 $\mu$mol/gram.

The low stachyose, low raffinose soy material may be any unrefined soy protein material including comminuted whole soybeans, soy flours, soy grits, soy flakes, and soy meals. Preferably the unrefined soy protein material contains less than 65% soy protein by weight on a moisture-free basis. Most preferably, the low raffinose, low stachyose unrefined soy protein material used as a starting material for the process is a low raffinose, low stachyose defatted soy flour, soy grit, soy meal, or soy flake material. Such soy materials may be produced from low raffinose, low stachyose whole soybeans from a soybean line having a heritable phenotype of low stachyose content in the same manner as described above with respect to soy flours, soy grits, soy meals, and soy flakes from conventional commodity soybeans.

The low raffinose, low stachyose unrefined soy protein material utilized in the present invention may be produced from soybeans which are derived from a soybean plant line having a heritable phenotype of low stachyose content. Stachyose and raffinose are produced in soybeans from glucose or sucrose starting materials by a series of enzymatically catalyzed reactions, where myo-inositol and galactinol are key intermediates in the formation of raffinose and stachyose. In soybeans myo-inositol-1-phosphate synthase catalyzes the formation of myo-inositol from sucrose (or glucose). Myo-inositol is utilized to form galactinol in conjunction with UDP galactose, where galactinol synthase catalyzes the reaction. Raffinose is formed from galactinol, catalzyed by the raffinose synthase enzyme, and stachyose is formed from raffinose and galactinol, catalyzed by the stachyose synthase enzyme.

Stachyose and raffinose accumulation in soybeans can be reduced or eliminated by selection or formation of soybean lines which under-express, express defectively, or do not express enzymes required for the formation of stachyose and raffinose. Selection or formation of soybean lines which under-express, express defectively, or do not express myo-inositol-1-phosphate synthase enzymes or galactinol synthase enzymes is particularly preferred to increase sucrose content in the soybean while decreasing or eliminating raffinose and stachyose concentrations.

PCT Publication No. WO98/45448 (Oct. 15, 1998), incorporated herein by reference, provides processes for producing soybean plants with a heritable phenotype of a seed content of raffinose plus stachyose combined of less than 14.5 µmol/g and a seed sucrose content of greater than 200 µmol/g, where the phenotype is due to a decreased capacity for the synthesis of myo-inositol-1-phosphate in the seeds of the plant. In one method, soybean seeds are treated with a mutagenic agent, preferably NMU (N-nitroso-N-methylurea), the treated soybean seeds are sown and selfed for several generations, and the resulting soybean plants are screened for the desired phenotype. Soybean plants having the desired phenotype are homozygous for at least one gene encoding a mutant myo-inositol-1-phosphate synthase enzyme having decreased capacity for the synthesis of myo-inositol-1-phosphate which confers a heritable phenotype of low stachyose, low raffinose, and high sucrose concentrations in its soybeans.

LR33 (Accession Number ATCC97988, Date of Deposit Apr. 17, 1997) is a soybean line having a low raffinose, low stachyose, high sucrose phenotype disclosed in PCT Publication No. WO98/45448 which was produced by the mutagenic method described above. Preferably, a soybean line having the desired phenotype, such as LR33, is crossed with an agronomically elite soybean line to yield a hybrid, then the hybrid is selfed for at least one generation, and the progeny of the selfed hybrid are screened to identify soybean lines homozygous for at least one gene encoding a mutant myo-inositol-1-phosphate synthase having decreased capacity for the synthesis of myo-inositol 1-phosphate, where the gene confers a heritable phenotype of a seed content of raffinose plus stachyose combined of less than 14.5 µmol/g and a seed sucrose content of greater than 200 µmol/g. The resulting hybrid is preferably an agronomically elite soybean having low raffinose and stachyose content and high sucrose content.

In a second method provided by PCT Publication No. WO98/45448, soybean plants can be genetically modified to achieve gene silencing of myo-inositol 1-phosphate synthase with the resulting associated seed phenotype. The specification of the application provides the nucleotide sequence of the gene responsible for the expression of myo-inositol 1-phosphate synthase, which can be utilized to form a chimeric gene with suitable regulatory sequences for the co-suppression or under-expression of myo-inositol 1-phosphate synthase. The chimeric gene may be inserted into the genome of a soybean plant according to procedures set forth in the application to provide a soybean plant in which the chimeric gene results in a decrease in the expression of a native gene encoding a soybean myo-inositol 1-phosphate synthase. The soybean plant having a decreased expression of myo-inositol 1-phosphate synthase has a low raffinose, low stachyose, and high sucrose content in its soybean seeds.

U.S. Pat. No. 5,648,210 to Kerr et al., incorporated herein in its entirety, provides nucleotide sequences of galactinol synthase from zucchini and soybean and methods of incorporating such nucleotide sequences into soybean plants to produce a transgenic soybean line having a low raffinose, low stachyose, and high sucrose heritable phenotype. The provided nucleotide sequences encode soybean seed galactinol synthase which, as noted above, is a key enzyme in the formation of raffinose and stachyose oligosaccharides from myo-inositol and UDP-galactose. Transfer of the nucleotide sequences encoding galactinol synthase in soybean into a soybean plant with suitable regulatory sequences that transcribe the antisense mRNA complementary to galactinol synthase mRNA, or its precursor, will result in the inhibition of the expression of the endogenous galactinol synthase gene, and, consequently, in reduced amounts of galactinol synthase, raffinose, and stachyose relative to untransformed soybean plants. Similarly, insertion of a foreign gene having substantial homology to the galactinol synthase gene into a soybean plant with suitable regulatory sequences may by utilized to inhibit the expression of the endogenous galactinol synthase gene by cosuppression.

The insertion and expression of foreign genes, such as the galactinol synthase nucleotide sequences provided in the '210 patent, in plants is well-established. See De Blaere et al. (1987) Meth. Enzymol. 153:277–291. Various methods of inserting the galactinol synthase nucleotide sequences into soybean plants in an antisense conformation are available to those skilled in the art. Such methods include those based on the Ti and Ri plasmids of Agrobacterium spp. It is particularly preferred to use the binary type of these vectors. Ti-derived vectors transform a wide variety of higher plants, including monocotyledonous and dicotyledonous plants such as soybean, cotton, and rape. [Pacciotti et al. (1985) Bio/Technology 3:241; Byrne et al. (1987) Plant Cell, Tissue and Organ Culture 8:3; Sukhapinda et al. (1987) Plant Mol. Biol. 8:209–216; Lorz et al (1985) Mol. Gen. Genet. 199:178; Potrykus (1985) Mol. Gen. Genet. 199:183]. Other transformation methods are available to those skilled in the art such as the direct uptake of foreign DNA constructs [see EPO publication 0 295 959 A2], techniques of electroporation [see Fromm et al. (1986) Nature (London) 319:791], or high velocity ballistic bombardment with metal particles coated with the nucleic acid constructs [see Kline et al. (1987) Nature (London) 327:70, and US 4]. Once transformed, the cells can be regenerated by those skilled in the art.

Preferably selected promoters, enhancers, and regulatory sequences can be combined with the antisense galactinol synthase nucleotide sequence or a substantially homologous cosuppressing foreign gene to form a nucleic acid construct which will most effectively inhibit the expression of galactinol synthase with a minimum of disruption to the soybean plant. Particularly preferred promoters are constitutive promoters and promoters which allow seed-specific expression such as promoters of genes for α- and β-subunits of soybean β-conglycinin storage protein. A preferred enhancer is a DNA sequence element isolated from the gene for the α-subunit of β-conglycinin, as described in the '210 patent, which can confer 40-fold seed-specific enhancement to a constituitive promoter.

U.S. Pat. No. 5,710,365 to Kerr et al, incorporated herein in its entirety, provides further soybean lines having low raffinose and low stachyose content, which include specific soybean genes, designated stc1x, which confer a heritable phenotype of low stachyose and low raffinose content relative to conventional commercially available soybeans. The stc1x genes are likely mutant genes which encode defective raffinose synthase and stachyose synthase enzymes, thereby inhibiting the production of raffinose and stachyose in the soybean plants from the stc1x soybean lines. The stc1x soybean lines are obtained by 1) exhaustive screening of existing soybean germplasm collections for sources of genes conferring low raffinose saccharide content; 2) inducing a mutation in the Stc1 gene of a conventional soybean line by chemical mutagenesis; or 3) crossing stc1x soybean lines obtained by methods 1 or 2 to find soybean lines having modifier genes which further reduce the production of raffinose and stachyose in the soybean plant by enhancing the expression of the stc1x genes. Soybean line LR28 was developed by the first method and soybean line LR484 (Accession No. ATCC 75325) was developed by the second method.

The low raffinose, low stachyose, soy material used in the compositions and processes of the present invention may be stacked to contain other selected traits which improve the flavor, appearance, or functionality of the flour or comminuted whole soy bean material. For example, one skilled in the art may genetically modify a soybean line to produce soybeans having a modified seed storage protein content (for varied nutritional profiles); or containing little or no lipoxygenase (to enhance flavor); or containing little or no phytic acid and/or phytates (to enhance nutritional profile); or containing yellow hylum (to enhance appearance); or having an enhanced isoflavone content relative to conventional commodity soybeans (to provide additional health benefits).

The unrefined soy protein starting material, whether a low raffinose, low stachyose soy material, a soy material derived from soybeans having a high seed storage protein content, or a soy material derived from conventional commodity soybeans, is hydrated. When hydrated, the unrefined soy protein material is most preferably in a particulate form such as a soy flour or soy grits, prepared as described above. Alternatively, the unrefined soy protein material may be in a non-particulate form when hydrated, for example a soy flake or a whole soybean material, where the soy material is comminuted into a particulate form after hydration, for example by blending or mixing the hydrated soy material to break the soy material into smaller pieces.

A sufficient amount of water is added to the unrefined soy protein material in the hydration step to facilitate the realignment of soy proteins in the soy material upon partial denaturation of the soy proteins by treatment of the hydrated unrefined soy protein material with heat. It is believed that the soy proteins realign in the water upon partial denaturation to form protein aggregates or aggregate precursors. The aggregates or aggregate precursors are formed as the partially denatured proteins reduce the interaction of newly exposed hydrophobic subunits of the protein with the water by shifting to energetically favorable intraprotein and interprotein hydrophobic-hydrophobic and hydrophilic-hydrophilic subunit interactions. Sufficient hydration of the unrefined soy protein material is important to ensure that the soy proteins can realign since treatment of the soy protein in the soy material with dry heat, or with moist heat (e.g. steam) but insufficient water, will denature or partially denature the soy protein in the soy material, but will not result in the desired product since the denatured proteins cannot realign absent sufficient water to facilitate the shifting of the soy proteins to favorable energy conformations. Preferably at least two parts of water are added per one part of unrefined soy protein material by weight to hydrate the soy material. More preferably at least four parts, six parts, or eight parts of water per part of soy material by weight are used to hydrate the unrefined soy protein material, and most preferably at least nine parts of water per part of soy material are utilized to hydrate the unrefined soy protein material.

In a preferred embodiment, the water used to hydrate the unrefined soy protein material has a temperature of from 50° C. to 85° C. The warm water facilitates hydration of the unrefined soy protein material and dispersion of the soy material in the water.

The hydrated unrefined soy protein material, in the form of an aqueous slurry of soy material containing at most 33% solids by weight, is thoroughly mixed to ensure that the soy material is dispersed in the water. The slurry is mixed by stirring, agitating, or blending the slurry with any conventional means for stirring, agitating, or blending capable of mixing the protein slurry.

If desired, sodium tripolyphosphate ("STPP") may be added to the aqueous slurry of hydrated unrefined soy protein material prior to exposing the soy material to conditions effective to partially denature soy protein in the unrefined soy protein material. STPP interacts with amine groups in the soy protein, and enhances the solubility of the unrefined soy protein material in an aqueous solution prior to and after the partial denaturation of the protein. Treatment of the unrefined soy protein material with STPP is particularly preferred since the STPP treated product has improved gel forming properties, improved gel strength, and reduced oxidative activity relative to products not treated with STPP. STPP is added to the aqueous slurry in an amount, by weight, not more than 3% of the weight of the unrefined soy protein material in the slurry, and preferably from 0.5% to 1.5%, by weight, of the weight of the unrefined soy protein material in the slurry.

The unrefined soy protein material slurry is then treated to irreversibly partially denature at least a portion of the soy protein in the hydrated unrefined soy protein material. As noted above, the soy protein in the unrefined soy protein material is partially denatured to unfold the protein and to induce the proteins to realign to form protein aggregates or aggregate precursors which enhance the gel and emulsion forming properties of the soy material. The soy protein in the hydrated unrefined soy protein material is partially denatured by treating the aqueous slurry of unrefined soy protein material at an elevated temperature for a time sufficient to partially denature at least a portion of the soy protein. Preferably the aqueous slurry of unrefined soy protein material is treated at a temperature of from about 75° C. to about 160° C. for a period of from about 2 seconds to about 2 hours to partially denature the soy protein in the soy material, where the hydrated unrefined soy protein material is heated for a longer time period at lower temperatures to partially denature the soy protein in the soy material. More preferably the hydrated unrefined soy protein material is treated at an elevated temperature and under a positive pressure greater than atmospheric pressure to partially denature the soy protein in the soy material.

The preferred method of irreversibly partially denaturing the soy protein in the hydrated unrefined soy protein material is treating the aqueous slurry of the soy material at a temperature elevated above ambient temperatures by injecting pressurized steam into the slurry for a time sufficient to partially denature at least a portion of the soy protein in the soy material, hereafter referred to as "jet-cooking." The following description is a preferred method of jet-cooking the hydrated unrefined soy protein material slurry, however, the invention is not limited to the described method and includes any obvious modifications which may be made by one skilled in the art.

The hydrated unrefined soy protein material is introduced into a jet-cooker feed tank where the soy material is kept in suspension with a mixer which agitates the soy material slurry. The slurry is directed from the feed tank to a pump which forces the slurry through a reactor tube. Steam is injected into the unrefined soy protein material slurry under pressure as the slurry enters the reactor tube, instantly heating the slurry to the desired temperature. The temperature is controlled by adjusting the pressure of the injected steam, and preferably is from about 75° C. to about 160° C., more preferably from about 100° C. to about 155° C. The slurry is treated at the elevated temperature for about 5 seconds to about 15 seconds, being treated longer at lower temperatures, with the treatment time being controlled by the flow rate of the slurry through the tube. Preferably the flow rate is about 18.5 lbs./minute, and the cook time is about 9 seconds at about 150° C.

After at least a portion of the soy protein in the unrefined soy protein material is irreversibly partially denatured by exposure to elevated temperatures, the hydrated unrefined soy protein material is dried in a manner effective to maintain the structure and alignment changes induced in the soy protein by the partial denaturation under hydrated conditions. In order to maintain the desired protein structure in the unrefined soy protein material, water is evaporated rapidly from the soy material. Preferably the hydrated unrefined soy protein material is dried so that the resulting dried unrefined soy protein material has a nitrogen solubility index of from about 30% to about 80%, more preferably from about 35% to about 75%, and most preferably from about 40% to about 70%.

In one embodiment of the present invention, the hydrated unrefined soy protein material is dried in two steps: a flash vaporization step followed by spray-drying the soy material. The hydrated partially-denatured unrefined soy protein material is flash vaporized by introducing the hydrated soy material into a vacuumized chamber having a cooler internal temperature than the temperature used to heat treat the soy material and having a pressure significantly less than atmospheric pressure. Preferably the vacuum chamber has an internal temperature of from 15° C. to 85° C. and a pressure of from about 25 mm to about 100 mm Hg, and more preferably to a pressure of from about 25 mm Hg to about 30 mm Hg. Introduction of the hydrated partially-denatured unrefined soy protein material into the vacuum chamber instantly drops the pressure about the soy material causing vaporization of a portion of the water from the hydrated soy material.

Most preferably the hydrated unrefined soy protein material slurry is discharged from the reactor tube of the jet-cooker into the vacuumized chamber, resulting in an instantaneous large pressure and temperature drop which vaporizes a substantial portion of water from the hydrated partially-denatured unrefined soy material. Preferably the vaccumized chamber has an elevated temperature up to about 85° C. to prevent the gelation of the unrefined soy protein material upon introduction of the hydrated unrefined soy protein material into the vacuumized chamber.

Applicants believe the flash vaporization step provides an unrefined soy protein material having low concentrations of volatile compounds associated with the beany, bitter flavor of soy such as n-pentane, diacetyl, pentanal, hexanal, 2-heptanone, 2-pentyl furan, and octanal. The heat treatment under pressure followed by the rapid pressure drop and vaporization of water also causes vaporization of substantial amounts of these volatile components, removing the volatile components from the unrefined soy protein material, and thereby improving the taste of the soy material.

The flash vaporized unrefined soy protein material slurry may then be spray-dried to produce the dry unrefined soy protein material food ingredient of the present invention. The spray-dry conditions should be moderate to avoid further denaturing the soy protein in the unrefined soy protein material. Preferably the spray-dryer is a co-current flow dryer where hot inlet air and the soy material slurry, atomized by being injected into the dryer under pressure through an atomizer, pass through the dryer in a co-current flow. The soy protein in the unrefined soy protein material is not subject to further thermal denaturation since the evaporation of water from the soy material cools the material as it dries.

In a preferred embodiment, the slurry of flash vaporized unrefined soy protein material is injected into the dryer through a nozzle atomizer. Although a nozzle atomizer is preferred, other spray-dry atomizers, such as a rotary atomizer, may be utilized. The slurry is injected into the dryer under enough pressure to atomize the slurry. Preferably the slurry is atomized under a pressure of about 3000 psig to about 4000 psig, and most preferably about 3500 psig.

Hot air is injected into the dryer through a hot air inlet located so the hot air entering the dryer flows co-currently with the atomized unrefined soy protein material slurry sprayed from the atomizer. The hot air has a temperature of about 285° C. to about 315° C., and preferably has a temperature of about 290° C. to about 300° C.

The dried unrefined soy protein material product is collected from the spray dryer. Conventional means and methods may be used to collect the soy material, including cyclones, bag filters, electrostatic precipitators, and gravity collection.

In another embodiment of the invention, the hydrated, partially denatured unrefined soy protein material slurry is spray-dried directly after the step of partially denaturing the soy protein in the hydrated soy material without the intermediate step of flash vaporization. The conditions for spray-drying the non-flash vaporized unrefined soy protein material are the same as described above with respect to the flash vaporized unrefined soy protein material.

In an alternative embodiment, if the solids content of the hydrated partially denatured unrefined soy protein material is too high for effective spray-drying, either with or without the step of flash vaporization, the high solids content unrefined soy protein material may be rapidly dried in accordance with the present invention by grinding and drying the partially denatured soy material simultaneously. Preferably, a high solids content partially denatured soy material is dried in a conventional hammermill or fluid energy mill that uses drying air and grinds the soy material as it is dried.

If desired, additional materials may be added to the dried unrefined soy protein material product to improve the performance of the soy material as a food ingredient. Sodium acid pyrophosphate and/or a gum, preferably guar gum, may be added to improve the flow characteristics of the unrefined soy protein material. Preferably, if added, up to 5% of sodium acid pyrophosphate and/or up to 5% of a gum, by weight, are added to the unrefined soy protein material. Other ingredients such as flavorants and coloring agents may also be added to the unrefined soy protein material. Less preferably, more refined soy protein products such as soy protein isolates or soy protein concentrates may be combined with the functional unrefined soy protein material to increase the protein content of the product and, in some cases, to increase the functionality of the product.

In a second embodiment, a process for forming a functional food ingredient is provided in which an unrefined soy protein material is hydrated; at least a portion of the soy protein in the hydrated unrefined soy protein material is irreversibly partially denatured by subjecting the hydrated soy material to shear at a temperature of at least 40° C.; and the partially denatured unrefined soy protein material is dried so the dried soy material has a nitrogen solubility index of from about 30% to about 80%. This embodiment of the invention differs from the process described above in that less water is required to hydrate the unrefined soy protein material since the shear to which the unrefined soy protein material is subjected facilitates realignment of the partially denatured proteins.

The unrefined soy protein material utilized as the starting material for the process of the second embodiment of the invention may be selected from the soy materials described above as starting materials for the process of the first embodiment of the invention. Most preferably, the unrefined soy protein material used as the starting material for the process of the second embodiment is a low raffinose, low stachyose, high sucrose soy flour.

The unrefined soy protein material is hydrated by adding water to the soy material. The amount of water required to hydrate the unrefined soy protein material is an amount of water sufficient to facilitate realignment and aggregation of soy proteins in the unrefined soy protein material and to facilitate blending and subjecting the soy material to shear. The unrefined soy protein material should be hydrated so that the soy material is present in the water/soy material mixture at a solids level of from about 15% to about 80%, by weight. Preferably at least one part of water is added to four parts of soy material, by weight, to hydrate the unrefined soy protein material. More preferably, at least one part of water is added to three parts of soy material, by weight, and most preferably at least one part of water is added to two parts of soy material, by weight, to hydrate the unrefined soy protein material. In a preferred embodiment, the water used to hydrate the unrefined soy protein material has a temperature of from 50° C. to 85° C. The warm water facilitates hydration of the soy material.

If desired, sodium tripolyphosphate may be added to the hydrated unrefined soy protein material prior to the partial denaturation step as described above to enhance the emulsion and gel forming properties of the soy material product.

At least a portion of the soy protein in the hydrated unrefined soy protein material is then irreversibly partially denatured by subjecting the hydrated unrefined soy protein material to elevated temperatures and to mechanical shear, preferably simultaneously, although the hydrated unrefined soy protein material may be subjected to mechanical shear after thermally denaturing the soy protein in the soy material. When the hydrated unrefined soy protein material is subjected to thermal denaturation simultaneous with mechanical shear, the soy protein in the hydrated unrefined soy protein material is irreversibly partially denatured by treating the hydrated soy material at a temperature of at least 40° C. for a period of time sufficient to partially denature a portion of the protein in the unrefined soy protein material, typically from 5 seconds to 10 minutes. More preferably, under conditions of simultaneous thermal denaturation and mechanical shear, the soy protein in the hydrated unrefined soy protein material is partially denatured by treating the hydrated unrefined soy protein material at a temperature of from about 70° C. to about 100° C. When mechanical shear is applied to the hydrated unrefined soy protein material after thermal denaturation, the soy protein in the hydrated unrefined soy protein material may be partially denatured by treating the hydrated unrefined soy protein material at a temperature of from 75° C. to 160° C., as described above with respect to irreversible partial denaturation of the unrefined soy protein material without mechanical shear.

The hydrated unrefined soy protein material may be subjected to mechanical shear using conventional equipment for mixing, blending, and shearing aqueous slurries of proteinaceous materials. In a particularly preferred embodiment, the soy protein in the hydrated unrefined soy protein material is partially denatured by extruding the hydrated unrefined soy protein material through a single-screw or twin-screw cooker-extruder, for example a Model TX57 Wenger twin-screw, co-rotating, fully intermeshing cooking extruder (available from Wenger Mfg, Sabetha, Kans.), in which heat and mechanical shear are simultaneously applied to the hydrated unrefined soy protein material. In another preferred embodiment, the soy protein in the hydrated unrefined soy protein material is partially denatured by mixing the soy material in a jacketed sigma blender, where heat and mechanical shear are simultaneously applied to the hydrated unrefined soy protein material.

After at least a portion of the soy protein in the unrefined soy protein material is partially denatured by exposure to elevated temperatures and mechanical shear, the hydrated unrefined soy protein material is dried in a manner effective to maintain the structure and alignment changes induced in the soy protein by the partial denaturation under hydrated conditions with mechanical shear. In order to maintain the desired protein structure in the unrefined soy protein material, water is evaporated rapidly from the unrefined soy protein material. Preferably the hydrated unrefined soy protein material is dried so that the resulting dried soy material has a nitrogen solubility index of from about 30% to about 80%, more preferably from about 35% to about 75%, and most preferably from about 40% to about 70%.

If the partially denatured hydrated unrefined soy protein material has a high solids content, e.g. the hydrated partially denatured soy material contains less than two parts water per one part soy material, the partially denatured unrefined soy protein material is rapidly dried by grinding and drying the unrefined soy protein material simultaneously. Preferably, a high solids content partially denatured unrefined soy protein material is dried in a conventional hammermill or fluid energy mill that uses drying air and grinds the soy material as it is dried. If the partially denatured hydrated unrefined soy protein material does not have a high solids content, the partially denatured soy material is dried by spray drying the soy material in the manner described above with respect to the first process for producing the novel unrefined soy protein material of the invention.

If desired, additional materials may be added to the dried unrefined soy protein material product to improve the performance of the unrefined soy protein material as a food ingredient. Sodium acid pyrophosphate and/or a gum, preferably guar gum, may be added to improve the flow characteristics of the unrefined soy protein material. Preferably, if added, up to 5% of sodium acid pyrophosphate and/or up to 5% of a gum, by weight, are added to the unrefined soy protein material. Other ingredients such as flavorants and coloring agents may also be added to the unrefined soy protein material. Less preferably, refined soy protein materials such as soy protein isolates or soy protein concentrates may be added to the unrefined soy protein material to increase the protein content and, in some cases, the functionality of the product.

Foods Containing the Functional Food Ingredient

The unrefined plant protein material functional food ingredient of the present invention is useful in numerous food applications to provide thickening, emulsification, and structural properties to foods. The functional food ingredient may be used in meat applications, particularly emulsified meats, soups, gravies, yogurts, dairy products, and breads.

A particularly preferred application in which the food ingredient of the present invention is used is in emulsified meats. The functional food ingredient may be used in emulsified meats to provide structure to the emulsified meat, which gives the emulsified meat a firm bite and a meaty texture. The functional food ingredient also decreases cooking loss of moisture from the emulsified meat by readily absorbing water, and prevents "fatting out" of the fat in the meat so the cooked meat is juicier.

The meat material used to form a meat emulsion in combination with the functional food ingredient composition of the present invention is preferably a meat useful for forming sausages, frankfurters, or other meat products which are formed by filling a casing with a meat material, or can be a meat which is useful in ground meat applications such as hamburgers, meat loaf and minced meat products. Particularly preferred meat materials used in combination with the functional food ingredient composition include mechanically deboned meat from chicken, beef, and pork; pork trimmings; beef trimmings; and pork backfat.

A meat emulsion containing a meat material and the unrefined plant protein material functional food ingredient composition contains quantities of each which are selected to provide the meat emulsion with desirable meat-like characteristics, especially a firm texture and a firm bite. Preferably the functional food ingredient composition is present in the meat emulsion in an amount of from about 3% to about 30%, by weight, more preferably from about 5% to about 20%, by weight. Preferably the meat material is present in the meat emulsion in an amount of from about 35% to about 70%, by weight, more preferably from about 40% to about 60%, by weight. The meat emulsion also contains water, which is preferably present in an amount of from about 25% to about 55%, by weight, and more preferably from about 30% to about 40%, by weight.

The meat emulsion may also contain other ingredients that provide preservative, flavoring, or coloration qualities to the meat emulsion. For example, the meat emulsion may contain salt, preferably from about 1% to about 4% by weight; spices, preferably from about 0.01% to about 3% by weight; and preservatives such as nitrates, preferably from about 0.01 to about 0.5% by weight.

Preferred meat emulsion formulations are provided in the following two formulation examples.

| Ingredient | Percent, by weight |
|---|---|
| FORMULATION 1 | |
| Functional food ingredient composition | |
| unrefined soy protein material | 8.2 |
| sodium tripolyphosphate | 0.4 |
| Pork 90 | 10.0 |
| Mechanically deboned chicken (18% fat) | 22.0 |
| Pork Back Fat | 18.3 |
| Pork Skin Emulsion | 7.0 |
| Water | 28.6 |
| Salt | 2.0 |
| Spice Mix | 0.4 |
| Carbohydrates (dextrose, corn syrup solids) | 3.0 |
| Preservatives | 0.1 |
| FORMULATION 2 | |
| Functional food ingredient composition | |
| unrefined soy protein material | 4.6 |
| sodium tripolyphosphate | 0.5 |
| Beef 90/10 | 7.5 |
| Pork Trims 70/30 | 10.0 |
| Pork Back Fat 5/95 | 16.8 |
| Pork Rind EMS 50:50 | 19.9 |
| Mechanically deboned chicken | 15.8 |
| Water | 22.8 |
| Salt | 2.0 |
| Spice | 0.02 |
| Colorant | 0.03 |
| Preservatives | 0.05 |

A meat emulsion product may be formed with the functional food ingredient composition and a meat material by blending or chopping the meat material, functional food ingredient composition, and water together to form a meat emulsion, and filling a casing with the meat emulsion. Selected amounts of meat material, water, and the functional food ingredient composition, within the ranges set forth above, are added together in a mixing or chopping bowl, together with any additional desired ingredients such as flavorings, colorants, and preservatives. The mixture is then blended by stirring, agitating, or mixing the mixture for a period of time sufficient to form a homogenous meat emulsion and to extract meat protein from the cells in which it is contained. Alternatively, the ingredients can be added separately after each previous ingredient is thoroughly mixed into the mixture, e.g., the water and meat material can be thoroughly blended, the food ingredient composition added and blended into the mixture, and other ingredients added and blended into the mixture after the meat material, water, and food ingredient composition are homogeneously mixed together.

Conventional means for stirring, agitating, or mixing the mixture may be used to effect the blending. Preferred means for blending the meat emulsion include a cutter bowl which chops the materials in the mixture with a knife, and a mixer/emulsifier which grinds the materials in the mixture. A preferred cutter bowl is the Hobart Food Cutter Model No. 84142 with 1725 rpm shaft speed.

After the mixture has been blended to form the meat emulsion, the meat emulsion may be used to prepare meat products. The meat emulsion may be used to stuff meat casings to form sausages, frankfurters, and similar products. The stuffed casings are preferably held in ice water for about thirty minutes, and then are cooked to form the meat products. The stuffed casings may be cooked by any conventional means for cooking meats, and preferably are cooked to an internal temperature of from about 70° C. to about 90° C. Preferably the stuffed casings are cooked by heating the casings in hot water, preferably at about 80° C., to an internal temperature of about 70° C.–80° C. Most preferably the stuffed casings are cooked in a water kettle cooker.

The resulting meat emulsion product containing the functional food ingredient composition has improved firmness, texture, springiness, and chewiness relative to meat emulsions formed with commodity unrefined soy protein materials such as soy flours, soy grits, soy meal, and soy flakes, and has comparable characteristics to meat emulsions formed with refined soy protein materials such as soy protein isolates and soy protein concentrates. The meat emulsion product containing the functional food ingredient composition displays substantial compression stability in meat emulsions containing low and medium grade meats (meats with little structural functionality), indicating a firm gel formation by the food ingredient composition.

Another particularly preferred application of the functional food ingredient composition is in creamed soups. The functional food ingredient provides significant viscosity to the soups, acts as an emulsifier, and provides a desirable texture to the soups.

The following examples illustrate novel soy material functional food ingredient compositions of the present invention and processes for producing the novel unrefined soy protein material. These examples are intended to demonstrate the utility and benefit of the novel unrefined soy protein material functional food ingredient and should not be interpreted as limiting the scope of the invention.

EXAMPLE 1

A novel unrefined soy protein material of the functional food composition of the present invention is prepared. Fifty pounds of commercially available commodity soy flakes are mixed with two hundred pounds of water at a temperature of about 85° C. in an agitated mixing tank. The water and the soy flakes are mixed in the mixing tank for 20 minutes. The resulting soy material slurry is jet-cooked at a temperature of about 154° C. for a period of 9 seconds through a reactor tube at a flow rate of twelve pounds per minute to partially denature and realign soy protein in the soy material slurry. The slurry is flash vaporized by ejecting the slurry from the jet-cooker reactor tube into a vacuumized chamber having a pressure of about 24 mm Hg and a temperature of about 54° C. The flash vaporized slurry of soy material is dried by spray-drying the slurry through a nozzle atomizer at a feed pressure of 3500 psig, and an exhaust temperature of about 90° C. Seven pounds of the novel soy material (hereinafter the "CV soy material") is collected from the spray dryer.

EXAMPLE 2

A novel unrefined soy protein material of the functional food composition of the present invention is prepared. Fifty pounds of low raffinose, low stachyose, high sucrose soy flakes are mixed with two hundred pounds of water at a temperature of about 83° C. in an agitated mixing tank. The water and the soy flakes are mixed in the mixing tank for 20 minutes. The resulting soy material slurry is jet-cooked at a temperature of about 152° C. for a period of 9 seconds through a reactor tube at a flow rate of twelve pounds per minute to partially denature and realign soy protein in the soy material slurry. The slurry is flash vaporized by ejecting the slurry from the jet-cooker reactor tube into a vacuumized chamber having a pressure of about 24 mm Hg and a temperature of about 50° C. The flash vaporized slurry of soy material is dried by spray-drying the slurry through a nozzle atomizer at a feed pressure of 3500 psig, and an exhaust temperature of about 90° C. Twenty six pounds of the novel low raffinose, low stachyose, high sucrose soy material (hereinafter the "HS soy material") is collected from the spray dryer.

EXAMPLE 3

Protein Content

The CV and HS soy materials produced in Examples 1 and 2 above are measured for soy protein content, and are compared to Cargill Flour 20 ("Flour 20"), a highly heat treated commodity soy flour available from Cargill, Inc., Cargill Flour 90 ("Flour 90"), a commodity soy flour treated with a minimum of heat to improve protein solubility commercially available from Cargill, Inc., and Arcon S, a soy protein concentrate commercially available from Archer Daniels Midland Company, Decatur, Ill. Samples of the CV and HS soy materials (1 gram of each), the Flour 20 and 90 (0.80 grams each), and the Arcon S protein concentrate (1 gram) are weighed into respective Kjeldahl flasks along with a catalyst mixture (16.7 grams $K_2SO_4$, 0.6 grams $TiO_2$, 0.01 grams copper sulfate, and 0.3 grams pumice) and 30 ml of concentrated $H_2SO_4$. The contents of the flasks are digested for 45 minutes by placing the flasks in boiling water baths and occasionally rotating the flasks. After digestion, 300 mls of water is added to each sample flask, and the flasks are cooled to room temperature. Sodium hydroxide solution (sp.gr. 1.5) is added to each flask to make the digestion solutions strongly alkaline. Distilled water and standardized 0.5 N hydrochloric acid solution are added to distillate receiving flasks for each sample (50 mls of HCl solution for the CV, HS, and Arcon S samples and 35 mls of HCl solution for the Flour 20 and 90 samples). The digested solutions are then distilled until 150 ml of distillate is collected in the receiving flasks. The contents of each receiving flask are titrated with 0.25 N NaOH solution using a methyl red indicator. The Total Nitrogen Content of the samples is determined from the amount of base titrant required, and the formula provided in the definitions section above for calculating nitrogen content. The protein content is the Total Nitrogen Content×6.25. The results of the protein content determinations are shown in Table 1 below.

TABLE 1

|  | CV Soy Material | HS Soy Material | Flour 20 | Flour 90 | Arcon S |
|---|---|---|---|---|---|
| Protein content (%) | 54.5 | 54.5 | 51.8 | 52.4 | 71.5 |

The Flour 20 and Flour 90 contain protein contents typical of soy flours, and the Arcon S contains a level of protein greater than 65%, by weight, indicative of the more extensive processing utilized to form a soy protein concentrate. The CV and HS Soy Materials contain less than 65% soy protein by weight, and closely approximate the soy protein content found in the flours.

EXAMPLE 4

Nitrogen Solubility Index

The nitrogen solubility indices of the HS and CV soy materials, the Flour 20 and 90 soy flours, and the Arcon S soy protein concentrate are measured to determine the relative solubilities of the protein materials. A low nitrogen solubility index, on a scale of 0–100%, indicates low protein solubility and a high nitrogen solubility index indicates a high protein solubility since protein solubility is proportional to the nitrogen solubility. The nitrogen solubility index ("NSI") of the HS and CV soy materials, the Flour 20 and Flour 90 materials, and the Arcon S protein concentrate is measured from the total nitrogen content of the samples determined in Example 3 above, and the soluble nitrogen of each sample. The soluble nitrogen content of each sample is determined by mixing the sample (5 grams of the CV, HS, and Arcon S samples, 3.5 grams of the Flour 20 sample, and 4 grams of the Flour 90 sample) with 200 milliliters of distilled water, stirring at 120 rpm for 2 hours at 30° C., and diluting each sample to 250 milliliters with further distilled water. 40 milliliters of each sample is decanted and centrifuged for 10 minutes at 1500 rpm. A 25 ml aliquot of the supernatant of each sample is analyzed for nitrogen content by placing the aliquots into respective Kjeldahl flasks along with a catalyst mixture (16.7 grams $K_2SO_4$, 0.6 grams $TiO_2$, 0.01 grams copper sulfate, and 0.3 grams pumice) and 30 ml of concentrated $H_2SO_4$. The contents of the flasks are digested for 45 minutes by placing the flasks in boiling water baths and occasionally rotating the flasks. After digestion, 300 mls of water is added to each sample flask, and the flasks are cooled to room temperature. Sodium hydroxide solution (sp.gr. 1.5) is added to each flask to make the digestion solutions strongly alkaline. Distilled water and standardized 0.5 N hydrochloric acid solution are added to distillate receiving flasks for each sample (25 mls of HCl solution for all samples). The digested solutions are then distilled until 150 ml of distillate is collected in the receiving flasks. The contents of each receiving flask are titrated with 0.25 N NaOH solution using a methyl red indicator. The soluble nitrogen content of the samples is determined from the amount of base titrant required, and the formula provided in the definitions section above for calculating nitrogen content. The nitrogen solubility index is determined from the total nitrogen content of the sample and the soluble nitrogen content of the sample according to the formula: Nitrogen Solubility Index=100×[soluble nitrogen content (%)/total nitrogen content (%)] The results are shown in Table 2 below.

TABLE 2

|  | CV Soy Material | HS Soy Material | Flour 20 | Flour 90 | Arcon S |
|---|---|---|---|---|---|
| NSI (%) | 47.5 | 44.3 | 44.4 | 85 | 6.10 |

The nitrogen solubility index of the CV and HS soy materials indicates that these materials have moderate soy protein solubility in an aqueous solution as a result of the partial denaturation of the soy protein in the material. The moderate solubility of the CV and HS soy materials promotes gel formation by aggregates of the partially denatured and rearranged soy proteins as described above. The NSI of the Flour 20 and the Arcon S soy protein concentrate indicates that the Flour 20 and Arcon S are also moderately soluble in an aqueous solution. The NSI of the Flour 90 shows that the protein in Flour 90 is very soluble in water and likely is substantially in its native globular form having undergone little denaturation.

EXAMPLE 5

Salt Tolerance Index

The salt tolerance indicies of the CV and HS soy materials, the Flour 20, Flour 90, and Arcon S materials are measured. The salt tolerance index measures the amount of protein in a sample which is soluble in an aqueous solution containing salt (sodium chloride). The salt tolerance index is an important measurement for protein containing food ingredients which are to be used in food systems containing salt (e.g. meat emulsions) since the protein in the food ingredient must not be made insoluble in substantial amounts by the presence of salt, or else the food ingredient will cause the food to have a gritty mouthfeel, and may lose gel or emulsion forming functionalities. The salt tolerance index is measured on a scale of 0–100%, where a low salt tolerance index (<25%) indicates protein insolubility or low protein solubility in a salt solution, and a high salt tolerance index indicates high protein solubility in a salt solution.

Five samples are prepared by mixing 0.75 grams of sodium chloride with 150 milliliters of deionized water having a temperature of 30° C. in each sample until the salt is completely dissolved in the water. 5 grams of the CV and HS soy material are added to separate samples, 5 grams of Arcon S is added to another sample, 4 grams of Flour 20 is added to another sample, and 4.3 grams of Flour 90 is added to the final sample. Each sample is mixed in a mixing chamber at 7000 rpm to blend the soy protein material and the salt solution of the sample. 50 milliliters of deionized water is added to each sample and the samples are stirred at 120 rpm for 60 minutes at 30° C. The samples are further diluted to a total volume of 250 ml with deionized water, and the samples are further mixed. 45 milliliters of each sample are centrifuged for 10 minutes at 500×g. Supernatant for each sample is collected by filtering the supernatant though filter paper. Protein content in the supernatant of each sample is determined by analyzing a 25 ml aliquot of the supernatant of each sample for protein content by placing the aliquots into respective Kjeldahl flasks along with a catalyst mixture (16.7 grams $K_2SO_4$, 0.6 grams $TiO_2$, 0.01 grams copper sulfate, and 0.3 grams pumice) and 30 ml of concentrated $H_2SO_4$. The contents of the flasks are digested for 45 minutes by placing the flasks in boiling water baths and occasionally rotating the flasks. After digestion, 300 mls of water are added to each sample flask, and the flasks are cooled to room temperature. Sodium hydroxide solution (sp.gr. 1.5) is added to each flask to make the digestion solutions strongly alkaline. Distilled water and standardized 0.5 N hydrochloric acid solution are added to distillate receiving flasks for each sample (25 mls of HCl solution for all samples). The digested solutions are then distilled until 150 ml of distillate is collected in the receiving flasks. The contents of each receiving flask are titrated with 0.25 N NaOH solution using a methyl red indicator. The protein content of the supernatant of the samples is determined from the amount of base titrant required, and the formula provided in the definitions section above for calculating protein content. The salt tolerance index is determined according to the formula: Salt Tolerance Index (%)=(100)×(50)×[(Percent Soluble Protein (in supernatant)]/[Percent Total Protein (of dry sample)], where the Percent Total Protein of the dry sample is provided above in Table 1 of Example 3. The results are shown in Table 3 below.

TABLE 3

|         | CV Soy Material | HS Soy Material | Flour 20 | Flour 90 | Arcon S |
|---------|-----------------|-----------------|----------|----------|---------|
| STI (%) | 54.7            | 52.2            | 25.5     | 41.7     | 40.6    |

The salt tolerance index of the HS and CV soy materials indicates that the presence of salt does not substantially affect the solubility of the protein in the materials. The Arcon S material is slightly affected, however, not to an extent which would cause the protein in the material to become insoluble or affect the functionality of the material. The Flour 20 is significantly affected by the presence of salt, and substantially loses protein solubility in the presence of salt. The Flour 90 is also significantly affected by the presence of salt, the protein changing from substantially soluble in a non-salt aqueous system to only partially soluble in the presence of salt.

EXAMPLE 6

Gel Weight

The gel weight of the HS and CV materials, the Flour 20 and 90 materials and the Arcon S is measured. Samples of each material are formed by chopping 200 grams of each sample in 1000 ml of deionized water at 20° C. in a Hobart Food Cutter, Model 84142 shaft speed 1725 rpm, for 4.5 minutes. At 4.5 minutes total chop time a pre-weighed 5 fluid ounce cup is filled with the sample slurry, and any excess slurry is scraped off of the top of the cup. The filled cup is tipped on its side on a cup holder located on a level surface so the rim of the cup extends slightly over the edge of the cup holder. After 5 minutes, any slurry that has poured out of the cup is sliced off by passing a straight-edge along the top edge of the cup. Any slurry remaining on the outside of the cup is wiped off, and the amount of slurry remaining in the cup is weighed. The weight of the gel is the difference between the weight of the cup and the weight of the cup and the gel. The results are shown in Table 4 below.

TABLE 4

|            | CV Soy Material | HS Soy Material | Flour 20 | Flour 90 | Arcon S |
|------------|-----------------|-----------------|----------|----------|---------|
| Gel Weight | 108 g           | 142 g           | 4.3 g    | 11 g     | 138 g   |

The CV and HS soy materials and the Arcon S soy protein concentrate formed substantial gels as indicated by the gel weight. The Flour 20 and Flour 90 were ineffective to form a substantial quantity of gel. The gel weight of the CV and HS materials indicate that these materials are useful for providing structure in a meat emulsion food application, particularly with respect to other soy protein containing materials having less than 65% soy protein content such as Flour 20 and Flour 90.

EXAMPLE 7

Refrigerated Gel Strength

The refrigerated gel strength is measured for samples of the CV and HS soy materials, the Flour 20 and Flour 90 materials, and the Arcon S soy protein concentrate. 540 grams of each material is mixed with 2160 milliliters of water and is mixed for 30 seconds to hydrate the sample. The slurry of each sample is then chopped for 6 minutes in a Hobart Food Cutter Model No. 84142 (1725 rpm shaft speed). 1300 grams of each sample slurry is removed from the chopper. 28 grams of salt is added to the remaining sample slurries and the slurries are chopped for an additional 3 minutes with the salt. Two 307×113 millimeter aluminum cans are filled to capacity with a salt slurry and a no-salt slurry for each sample, and then are sealed. The salt slurry and no-salt slurry for each sample is then refrigerated for 16 to 24 hours at −5° C. to 5° C. The gel strength of each salt slurry and no-salt slurry for each sample is then measured using an Instron Universal Testing Instrument Model No. 1122 with a 36 mm disk probe using a 1000 lb load cell. The Instron Instrument is calibrated to a full scale load of 500 lbs with a compression speed at 5 inches per minutes and a chart speed of 10 inches per minute. The gel strength is measured by placing each gel in the Instron Instrument and measuring the gel break point upon insertion of a probe into the gel. The gel break point is recorded on the chart by the Instron Instrument. The gel strength is calculated according to the following formula: Gel Strength (grams)=(454)×(Full Scale Load of the instrument required to break the gel)×[(recorded break point of the gel (in instrument chart units out of a possible 100 units))/100]. The gel strengths for the salt gel and no-salt gel for each of the samples is shown in Table 5 below.

TABLE 5

|              | CV Soy Material | HS Soy Material | Flour 20 | Flour 90 | Arcon S |
|--------------|-----------------|-----------------|----------|----------|---------|
| Gel Strengh  |                 |                 |          |          |         |
| No salt (g)  | 119             | 222             | 0        | 0        | 216     |
| Salt (g)     | 148             | 232             | 0        | 0        | 216     |

As shown in the results above, the CV and HS soy materials and the Arcon S soy protein concentrate have substantial gel strengths under conditions of refrigeration. The Flour 20 and Flour 90 materials, however, are too soft to measure for gel strength, and do not form a refrigerated gel having any appreciable gel strength.

EXAMPLE 8

Viscosity

The viscosity of samples of the CV and HS soy materials, the Flour 20 and Flour 90 materials, and the Arcon S soy protein concentrate are measured using a Brookfield viscometer with a large annulus. 62.5 grams of each sample material is weighed and mixed with 437.5 milliliters of water. 6 grams of salt is measured separately for each sample to be added later to the sample slurry to form a 2% salted slurry. Each sample and water are thoroughly mixed for 5 minutes using a Servodyne mixer set at 1000 rpm. After 5 minutes exactly 200 grams of the slurry of each sample is removed and placed in respective cups. The 6 grams of salt is added to the remaining 300 grams of each slurry and is mixed for an additional 2 minutes. The viscosity of each sample is then measured with the Brookfield viscometer at 25° C. The results for each sample are shown below in Table 6.

TABLE 6

|  | CV Soy Material | HS Soy Material | Flour 20 | Flour 90 | Arcon S |
|---|---|---|---|---|---|
| Viscosity cps |  |  |  |  |  |
| No salt | 620 | 1800 | 12 | 110 | 1260 |
| Salt | 600 | 1600 | 13 | 58 | 920 |

The CV and HS soy materials and the Arcon S soy protein concentrate all have substantial viscosity at 25° C. in a 12.5% aqueous slurry of the soy protein containing material, by weight. The high viscosity of the CV and HS soy materials permits their use as thickening agents in foods, particularly in creamed soups. The Flour 20 and Flour 90 soy flours provide little viscosity under comparable conditions.

EXAMPLE 9

Water Activity

The water activity ($A_W$) of the HS soy material and the Flour 20 and Flour 90 is measured. A low water activity indicates that there is relatively little free water in a material which is capable of supporting microbial growth which would lead to spoilage of the material or which is capable of supporting enzymatic activity which could lead to poor flavor.

A sample cup is filled between one-third to one-half full with the HS soy material, the Flour 20 or the Flour 90 material, and the sample cup is inserted into the sample chamber of an AquaLab CX2 from Decagon Devices. The chamber door is closed, and the water activity is measured using a chilled dewpoint technique by the AquaLab CX2. The results for the HS soy material and the Flour 20 and Flour 90 are shown in Table 7 below.

TABLE 7

|  | HS Soy Material | Flour 20 | Flour 90 |
|---|---|---|---|
| Water activity | 0.2 | 0.39 | 0.37 |

The HS soy material has a significantly lower $A_W$ than the Flour 20 and Flour 90 materials.

EXAMPLE 10

Water Hydration Capacity

The water hydration capacity of the CV and HS materials, the Flour 20 and Flour 90, and the Arcon S soy protein concentrate is measured. The water hydration capacity is a direct measure of the maximum amount of water a material can absorb and retain under low speed centrifugation. A high water hydration capacity is desirable in a soy protein containing food ingredient. A soy protein containing food ingredient with a high water hydration capacity is desirable as a component in a meat emulsion to prevent loss of water contained in the meat upon cooking, thereby providing a more tender mouthfeel to the cooked meat emulsion. A soy protein containing food ingredient with a high water hydration capacity is desirable as a component in a creamed soup, gravy, yogurt, or dip to thicken the food.

To determine the water hydration capacity of the materials, first the solids content of the materials is determined. Five grams of each of the CV and HS materials, the Flour 20 and Flour 90, and Arcon S are weighed onto a tared moisture dish. The dish is placed in an oven and dried at 130° C. for 2 hours. The dish is then cooled in a dessicator to room temperature. The dish is reweighed to determine the weight of the moisture-free sample. The moisture content of the samples is calculated according to the formula: moisture content (%)=100×[(loss in mass (grams)/mass of original sample (grams)]. The solids content of the samples is calculated from the moisture content according to the formula: solids content (%)=5×[1−(Moisture content/100)].

Four grams of each of the CV and HS materials, the Flour 20 and Flour 90, and Arcon S are then measured and obtained as samples. Tare weights are obtained for centrifuge tubes for each sample, and then the samples are placed into their respective centrifuge tube. Deionized water is added to each sample in 2 ml increments until the sample is thoroughly wetted. The samples are then centrifuged at 2000×g for 10 minutes. Immediately after centrifugation each sample is examined for excess water. If a sample contains no excess water, deionized water is again added in 2 ml increments until the sample is thoroughly wetted, and the sample is centrifuged at 2000×g for 10 minutes. This process is repeated until each sample contains an excess of water.

The excess water is then decanted, and the tube and its contents are weighed. The approximate water hydration capacity is calculated for each sample as the difference of the weight of the hydrated sample and 4 grams divided by 4. Four centrifuge tubes are then prepared for each sample, and 4 grams of each sample are added to the four tubes. A volume of water is added to the four tubes for each sample, where the volume of water for the first tube is equal to the (approximate water hydration capacity×4)−1.5; the volume of water in the second tube is 1 ml greater than in the first tube, the volume of water in the third tube is 1 ml greater than in the second tube, and the volume of water in the fourth tube is 1 ml greater than in the third tube. The four tubes of each sample are then centrifuged at 2000×g for 10 minutes. The centrifuged tubes are examined to determine which of the tubes encompass the water hydration capacity—where one of the tubes encompassing the water hydration capacity will contain a slight excess of water and the other tube will have no excess water. The water hydration capacity is calculated according to the formula: water hydration capacity (%)=100×[(volume of water added to sample with excess water+volume of water added to sample with no excess water)/(Solids content of sample)×2]. The water hydration capacities for the materials are shown in Table 8 below.

TABLE 8

|  | CV Soy Material | HS Soy Material | Flour 20 | Flour 90 | Arcon S |
|---|---|---|---|---|---|
| WHC (%) | 3.97 | 3.82 | 1.97 | 2.34 | 4.79 |

The water hydration capacity of the CV and HS soy materials is substantially greater than that of the Flour 20 and Flour 90 materials, and is closer to that of the soy protein concentrate.

EXAMPLE 11

Trypsin Inhibitor Activity

The trypsin inhibitor activity of the CV and HS soy materials, the Flour 20 and Flour 90, and Arcon S is measured. The trypsin inhibitor activity refers to the activity of components in soy material which inhibit trypsin activity. Low trypsin inhibitor activities are desirable in soy food ingredient compositions, since trypsin inhibition is associated with hyperactive pancreatic activity and growth inhibition.

Samples of the CV and HS soy materials, the Flour 20 and Flour 90, and Arcon S are measured for trypsin inhibitor activity according to the process provided in the definition section above. The results are set forth in Table 9 below.

TABLE 9

|        | CV Soy Material | HS Soy Material | Flour 20 | Flour 90 | Arcon S |
|--------|-----------------|-----------------|----------|----------|---------|
| TIU/mg | 10.6            | 9.8             | 15.9     | 56.7     | 5.3     |

As shown in Table 9, the HS and CV soy materials have low trypsin inhibitor activity which is comparable to the Arcon S soy protein concentrate. The CV and HS soy materials have lower trypsin inhibitor activites than either soy flour, including the highly heat treated Flour 20. Applicants believe that the extremely low trypsin inhibitor activity of the CV and HS materials, even relative to a soy flour that has been subjected to high heat treatment, is due to heating the CV and HS materials in the presence of a substantial amount of water. The water assists in conducting heat to the trypsin inhibiting protein components in the soy material, thereby assisting in the denaturation and deactivation of these components.

EXAMPLE 12

Concentration of Volatile Compounds

The concentration of volatile compounds associated with the bitter, beany taste of soy materials is measured in the HS material and in the Flour 20 and Flour 90 materials. 5 grams of each material is added to a reaction vial and 25 ml of ethyl isobutyrate internal standard (Aldrich Cat. No. 24,608-5) is added to each vial. The reaction vial for each sample is then immediately sealed with a septum and mixed by vigorously shaking the vial by hand for 15 seconds until the slurry in the vial is homogenous. Immediately after mixing the reaction vial for each sample is placed in a forced draft oven at 80° C. for 30 minutes. A clean syringe for each sample is placed in the oven 27 minutes after the samples were placed in the oven. The samples and syringes are removed from the oven and 5 ml of each sample are individually injected into a Perkin-Elmer Sigma 300 Gas-Liquid Chromatograph with flame ionization detector. The concentration of the volatile compounds is measured by instrumental integration of the peaks determined by the GC/LC measured against a standard ethyl butyrate solution. The results are shown in Table 10 below.

TABLE 10

|              | HS Soy Material (ppm) | Flour 20 (ppm) | Flour 90 (ppm) |
|--------------|-----------------------|----------------|----------------|
| n-pentane    | 12.5                  | 46.3           | 881.6          |
| Diacetyl     | 42.3                  | 3902.0         | 22765.0        |
| Pentanal     | 40.8                  | 1251.0         | 35889.0        |
| Hexanal      | 629.4                 | 516.2          | 3463.0         |
| 2-heptanone  | 0                     | 19.6           | 91.0           |

TABLE 10-continued

|              | HS Soy Material (ppm) | Flour 20 (ppm) | Flour 90 (ppm) |
|--------------|-----------------------|----------------|----------------|
| 2-pentyl furan | 0                   | 0              | 22.0           |
| octanal      | 0                     | 0              | 32.3           |

As shown in Table 10, the HS soy material has low concentrations of the n-pentane, diacetyl, pentanal, hexanal, 2-heptanone, 2-pentyl furan, and octanal as a group relative to the Flour 20 and Flour 90 materials.

EXAMPLE 13

Effect of STPP

Selected physical characteristics of the CV and HS materials examined in the Examples above are compared with the physical characteristics of a CV and HS material which includes sodium tripolyphosphate (STPP). STPP CV and HS soy materials are formed in the same manner as the CV and HS materials, as described in Examples 1 and 2, respectively, except that 230 grams of STPP is mixed with the initial soy flake and water slurry, and the slurry contains 230 pounds of water instead of 200 pounds of water. Experiments to determine the physical characteristics of the STPP CV and HS soy materials are conducted according to the methods set out in the Examples above for the non-STPP CV and HS materials. The physical characteristics of the STPP CV and HS soy materials are compared with the non-STPP CV and HS soy material physical characteristics in Table 11 below.

TABLE 11

|                     | CV Soy Material | STPP CV Soy Material | HS Soy Material | STPP HS Soy Material |
|---------------------|-----------------|----------------------|-----------------|----------------------|
| Protein Content     | 54.5            | 55.0                 | 54.5            | 52.5                 |
| NSI (%)             | 47.5            | 77.8                 | 44.3            | 76.4                 |
| STI (%)             | 54.7            | 66.6                 | 52.2            | 41.3                 |
| Gel Weight (g)      | 108             | 82.1                 | 142             | 146.7                |
| Viscosity (cps)     |                 |                      |                 |                      |
| no salt             | 620             | 1020                 | 1800            | 2800                 |
| 2% salt             | 600             | 1180                 | 1600            | 2800                 |
| WHC (%)             | 3.97            | 4.84                 | 3.82            | 4.84                 |
| TIU/mg              | 10.6            | 13.8                 | 9.8             | 10.3                 |

The addition of STPP to the CV and HS soy materials clearly increases the viscosity and water hydration capacity of the soy materials. STPP also clearly increases the solubility of protein in the soy material in an aqueous solution, as indicated by the NSI and STI values of the STPP CV and HS soy materials relative to non-STPP CV and HS soy materials. Therefore, STPP can be added to the CV or HS soy material when such characteristics are desirable in a food material in which the soy material is to be used as a food ingredient.

EXAMPLE 14

A Meat Emulsion Containing the Soy Protein Functional Food Ingredient

A meat emulsion is formulated with an STPP HS soy material formulated according to the process set forth in Example 13. The following ingredients are measured out in the correct weight percentages, so the total emulsion will weigh 4000 g.

| Ingredient | Percent, by weight | Wt (g) |
|---|---|---|
| Functional food ingredient composition | | |
| soy protein material | 8.2 | 328.0 |
| sodium tripolyphosphate | 0.4 | 16.0 |
| Pork 90 | 10.0 | 400.0 |
| Mechanically deboned chicken (18% fat) | 22.0 | 880.0 |
| Pork Back Fat | 18.3 | 733.2 |
| Pork Skin Emulsion | 7.0 | 280.0 |
| Water | 28.6 | 1145.0 |
| Salt | 2.0 | 80.0 |
| Spice Mix | 0.4 | 14.4 |
| Carbohydrates (dextrose, corn syrup solids) | 3.0 | 120.0 |
| Preservatives | 0.1 | 3.4 |

The Pork 90, mechanically deboned chicken, pork back fat, and pork skin emulsion are tempered at 10° C. overnight. The Pork 90 and Pork Back Fat are then ground to ⅛ inch in a grinder with ⅛ inch plates. The Pork 90, mechanically deboned chicken, ½ of the water and ½ of the functional food ingredient are chopped together at low speed for 30 seconds in a Stephen Cutter with vacuum and temperature probe. The remaining ingredients are added, and a vacuum is pulled while chopping on low for 30 seconds, then the ingredients are chopped at high speed until the product achieves a temperature of 14° C. 48 mm flat width, 30 cm length PVDC casings are then stuffed with the chopped ingredients. The stuffed casings are held in ice water for at least 30 minutes, and then are cooked in an 80° C. water kettle cooker to an internal temperature of 73° C. The cooked meat emulsion is then cooled in ice water.

EXAMPLE 15

Comparison of Meat Emulsion Formed with the Functional Food Ingredient with Meat Emulsions Formed with Soy Protein Concentrates The meat emulsion formed in accordance with Example 14 is compared with soy protein concentrate meat emulsions for firmness of texture. Two meat emulsions are formed with soy protein concentrates, one with Arcon S, and the other with the soy protein concentrate Maicon, commercially available from Soya Mainz GmbH. The soy protein concentrate meat emulsions are formed in the same manner as described in Example 13, except that the soy protein concentrate is substituted for the functional food ingredient in the formula.

8×1 inch samples are taken from each meat emulsion—the functional food ingredient emulsion of the invention—Arcon S, and Maicon, and the samples are evaluated for first compression hardness on an Instron Two Cycle TPA. First compression hardness is measured by compressing the meat emulsion with a plate until the meat emulsion breaks. The point at which the meat emulsion breaks is the first compression hardness. The first compression hardness indicates how firm the meat emulsion is, and the texture of the meat emulsion. The results for each sample meat emulsion are shown in Table 12 below.

TABLE 12

| | STPP HS Soy Material | Arcon S | Maicon |
|---|---|---|---|
| 1st compression hardness | 5676 g | 7194 g | 4342 g |

The STPP HS soy material meat emulsion performs favorably in the first compression hardness test with the higher protein content soy protein concentrates. The first compression hardness test indicates that the STPP HS soy material can provide the requisite structure to a meat emulsion despite its relative lack of protein compared to the soy protein concentrates.

The above description is intended to be descriptive of the present invention, but not limiting thereof. Therefore, it is to be understood that the embodiments described above are illustrative and are not intended to limit the scope of the invention, which is defined by the following claims as interpreted according to the principles of patent law, including the doctrine of equivalents.

What is claimed is:

1. A functional food ingredient comprising an unrefined plant protein material wherein said unrefined plant protein material forms a gel having a gel weight of at least 30 grams at a temperature of from about 15° C. to about 25° C. in a 5 fluid ounce mixture of 5 parts water per 1 part unrefined plant protein material, by weight.

2. The functional food ingredient of claim 1 wherein said unrefined plant protein material forms a gel having a gel weight of at least 50 grams at a temperature of from about 15° C. to about 25° C. in a 5 fluid ounce mixture of 5 parts water per 1 part unrefined plant protein material, by weight.

3. The functional food ingredient of claim 1 wherein said unrefined plant protein material forms a gel having a gel weight of at least 100 grams at a temperature of from about 15° C. to about 25° C. in a 5 fluid ounce mixture of 5 parts water per 1 part of unrefined plant protein material, by weight.

4. The functional food ingredient of claim 1 wherein said unrefined plant protein material is an unrefined soy protein material.

5. The functional food ingredient of claim 4 wherein said unrefined soy protein material is selected from the group consisting of soy flour, soy grits, soy meal, and soy flakes.

6. The functional food ingredient of claim 5 wherein said unrefined soy protein material is defatted.

7. The fictional food ingredient of claim 4 wherein said unrefined soy protein material has a trypsin inhibitor activity of at most 10 trypsin inhibitor units per milligram of unrefined soy protein material.

8. The functional food ingredient of claim 4 wherein said unrefined soy protein material contains less than 20 ppm n-pentane, 50 ppm pentanal, 650 ppm hexanal, 10 ppm 2-heptanone, 10 ppm 2-pentyl furan, and 10 ppm octanal.

9. The functional food ingredient of claim 4 wherein said unrefined soy protein material contains at most 20 $\mu$mol of raffinose per gram of said unrefined soy protein material, and at most 35 $\mu$mol of stachyose per gram of said unrefined soy protein material, wherein said unrefined soy protein material is derived from soybeans from a soybean line having a heritable phenotype of low stachyose content.

10. The functional food ingredient of claim 1 wherein said unrefined plant protein material has a nitrogen solubility index of from 30% to 80%.

11. The functional food ingredient of claim 10 wherein said unrefined plant protein material has a salt tolerance index of from 30% to 80%.

12. The functional food ingredient of claim 1 wherein said unrefined plant protein material has a protein content of less than 65% plant protein by weight on a moisture-free basis.

13. The functional food ingredient of claim 12 wherein said unrefined plant protein material has a plant protein content of less than 60% plant protein by weight on a moisture-free basis.

14. The functional food ingredient of claim 1 wherein said unrefined plant protein material has a plant protein content of at least 20% plant protein by weight on a moisture-free basis.

15. The functional food ingredient of claim 1 wherein said unrefined plant protein material has a water activity of 0.3 or less.

16. The functional food ingredient of claim 1 further comprising sodium tripolyphosphate, sodium acid pyrophosphate, guar gum, or a mixture thereof.

17. A functional food ingredient comprising an unrefined plant protein material wherein said unrefined plant protein material, when mixed with 5 parts of water per part of unrefined plant protein material, by weight, forms an unrefined plant protein material/water mixture having a refrigerated gel strength of at least 50 grams.

18. The functional food ingredient of claim 17 wherein said unrefined plant protein material, when mixed with 5 parts of water per part of unrefined plant protein material, by weight, forms an unrefined plant protein material/water mixture having a refrigerated gel strength of at least 100 grams.

19. The functional food ingredient of claim 17 wherein said unrefined plant protein material, when mixed with 5 parts of water per part of unrefined plant protein material, by weight, forms an unrefined plant protein/water mixture having a refrigerated gel strength of at least 200 grams.

20. The functional food ingredient of claim 17 wherein said unrefined plant protein material is an unrefined soy protein material.

21. The functional food ingredient of claim 20 wherein said unrefined soy protein material is selected from the group consisting of soy flour, soy grits, soy meal, and soy flakes.

22. The functional food ingredient of claim 20 wherein said unrefined soy protein material is defatted.

23. The functional food ingredient of claim 20 wherein said unrefined soy protein material has a trypsin inhibitor activity of at most 10 trypsin inhibitor units per milligram of unrefined soy protein material.

24. The functional food ingredient of claim 20 wherein said unrefined soy protein material contains less than 20 ppm n-pentane, 50 ppm pentanal, 650 ppm hexanal, 10 ppm 2-heptanone, 10 ppm 2-pentyl furan, and 10 ppm octanal.

25. The functional food ingredient of claim 20 wherein said unrefined soy protein material contains at most 20 $\mu$mol of raffinose per gram of said unrefined soy protein material, and at most 35 $\mu$mol of stachyose per gram of said unrefined soy protein material, wherein said unrefined soy protein material is derived from soybeans from a soybean line having a heritable phenotype of low stachyose content.

26. The functional food ingredient of claim 17 wherein said unrefined plant protein material has a nitrogen solubility index of from 30% to 80%.

27. The functional food ingredient of claim 26 wherein said unrefined plant protein material has a salt tolerance index of from 30% to 80%.

28. The functional food ingredient of claim 17 wherein said unrefined plant protein material has a protein content of less than 65% plant protein by weight on a moisture-free basis.

29. The functional food ingredient of claim 28 wherein said unrefined plant protein material has a plant protein content of less than 60% plant protein by weight on a moisture-free basis.

30. The functional food ingredient of claim 17 wherein said unrefined plant protein material has a plant protein content of at least 20% plant protein by weight on a moisture-free basis.

31. The functional food ingredient of claim 17 wherein said unrefined plant protein material has a water activity of 0.3 or less.

32. The functional food ingredient of claim 17 further comprising sodium tripolyphosphate, sodium acid pyrophosphate, guar gum, or a mixture thereof.

33. A functional food ingredient comprising an unrefined plant protein material, wherein said unrefined plant protein material has a nitrogen solubility index of from 30% to 80% and wherein said unrefined plant protein material forms an aqueous slurry having a viscosity of at least 500 centipoise at a temperature of 15° C. to 25° C. when mixed with 7 parts of water per part of unrefined plant protein material, by weight.

34. The functional food ingredient of claim 33 wherein said unrefined plant protein material forms an aqueous slurry having a viscosity of at least 1000 centipoise at a temperature of 15° C. to 25° C. when mixed with 7 parts of water per part of unrefined plant protein material, by weight.

35. The functional food ingredient of claim 33 wherein said unrefined plant protein material forms an aqueous slurry having a viscosity of at least 1500 centipoise at a temperature of 15° C. to 25° C. when mixed with 7 parts of water per part of unrefined plant protein material, by weight.

36. The functional food ingredient of claim 33 wherein said unrefined plant protein material is an unrefined soy protein material.

37. The functional food ingredient of claim 36 wherein said unrefined soy protein material is selected from the group consisting of soy flour, soy grits, soy meal, and soy flakes.

38. The functional food ingredient of claim 37 wherein said unrefined soy protein material is defatted.

39. The functional food ingredient of claim 36 wherein said unrefined soy protein material has a trypsin inhibitor activity of at most 10 trypsin inhibitor units per milligram of unrefined soy protein material.

40. The functional food ingredient of claim 36 wherein said unrefined soy protein material contains less than 20 ppm n-pentane, 50 ppm pentanal, 650 ppm hexanal, 10 ppm 2-heptanone, 10 ppm 2-pentyl furan, and 10 ppm octanal.

41. The functional food ingredient of claim 36 wherein said unrefined soy protein material contains at most 20 $\mu$mol of raffinose per gram of said unrefined soy protein material, and at most 35 $\mu$mol of stachyose per gram of said unrefined soy protein material, wherein said unrefined soy protein material is derived from soybeans from a soybean line having a heritable phenotype of low stachyose content.

42. The functional food ingredient of claim 33 wherein said unrefined plant protein material has a salt tolerance index of from 30% to 80%.

43. The functional food ingredient of claim 33 wherein said unrefined plant protein material has a protein content of less than 65% plant protein by weight on a moisture-free basis.

44. The functional food ingredient of claim 43 wherein said unrefined plant protein material has a plant protein content of less than 60% plant protein by weight on a moisture-free basis.

45. The functional food ingredient of claim 33 wherein said unrefined plant protein material has a plant protein content of at least 20% plant protein by weight on a moisture-free basis.

46. The functional food ingredient of claim 33 wherein said unrefined plant protein material has a water activity of 0.3 or less.

47. The functional food ingredient of claim 33 further comprising sodium tripolyphosphate, sodium acid pyrophosphate, guar gum, or a mixture thereof.

48. A functional food ingredient comprising an unrefined plant protein material wherein said unrefined plant protein material has a nitrogen solubility index of from 30% to 80% and wherein said unrefined plant protein material has a water hydration capacity of at least 3.75 times the weight of the unrefined plant protein material.

49. The functional food ingredient of claim 48 wherein said unrefined plant protein material is an unrefined soy protein material.

50. The functional food ingredient of claim 49 wherein said unrefined soy protein material is selected from the group consisting of soy flour, soy grits, soy meal, and soy flakes.

51. The functional food ingredient of claim 49 wherein said unrefined soy protein material is defatted.

52. The functional food ingredient of claim 49 wherein said unrefined soy protein material has a trypsin inhibitor activity of at most 10 trypsin inhibitor units per milligram of unrefined soy protein material.

53. The functional food ingredient of claim 49 wherein said unrefined soy protein material contains less than 20 ppm n-pentane, 50 ppm pentanal, 650 ppm hexanal, 10 ppm 2-heptanone, 10 ppm 2-pentyl furan, and 10 ppm octanal.

54. The functional food ingredient of claim 49 wherein said unrefined soy protein material contains at most 20 $\mu$mol of raffinose per gram of said unrefined soy protein material, and at most 35 $\mu$mol of stachyose per gram of said unrefined soy protein material, wherein said unrefined soy protein material is derived from soybeans from a soybean line having a heritable phenotype of low stachyose content.

55. The functional food ingredient of claim 48 wherein said unrefined plant protein material has a salt tolerance index of from 30% to 80%.

56. The functional food ingredient of claim 48 wherein said unrefined plant protein material has a protein content of less than 65% plant protein by weight on a moisture-free basis.

57. The functional food ingredient of claim 56 wherein said unrefined plant protein material has a plant protein content of less than 60% plant protein by weight on a moisture-free basis.

58. The functional food ingredient of claim 48 wherein said unrefined plant protein material has a plant protein content of at least 20% plant protein by weight on a moisture- free basis.

59. The functional food ingredient of claim 48 wherein said unrefined plant protein material has a water activity of 0.3 or less.

60. The functional food ingredient of claim 48 further comprising sodium tripolyphosphate, sodium acid pyrophosphate, guar gum, or a mixture thereof.

61. A functional food ingredient comprising an unrefined plant protein material having a nitrogen solubility index of from about 30% to about 80% and a salt tolerance index of from about 30% to about 80%.

62. The functional food ingredient of claim 61 wherein said unrefined plant protein material has a nitrogen solubility index of from about 35% to about 75% and a salt tolerance index of from about 35% to about 75%.

63. The functional food ingredient of claim 61 wherein said unrefined plant protein material has a nitrogen solubility index of from about 40% to about 70% and a salt tolerance index of from about 40% to about 70%.

64. The functional food ingredient of claim 61 wherein said unrefined plant protein material is an unrefined soy protein material.

65. The functional food ingredient of claim 64 wherein said unrefined soy protein material is selected from the group consisting of soy flour, soy grits, soy meal, and soy flakes.

66. The functional food ingredient of claim 64 wherein said unrefined soy protein material is defatted.

67. The functional food ingredient of claim 64 wherein said unrefined soy protein material has a trypsin inhibitor activity of at most 10 trypsin inhibitor units per milligram of unrefined soy protein material.

68. The functional food ingredient of claim 64 wherein said unrefined soy protein material contains less than 20 ppm n-pentane, 50 ppm pentanal, 650 ppm hexanal, 10 ppm 2-heptanone, 10 ppm 2-pentyl furan, and 10 ppm octanal.

69. The functional food ingredient of claim 64 wherein said unrefined soy protein material contains at most 20 $\mu$mol of raffinose per gram of said unrefined soy protein material, and at most 35 $\mu$mol of stachyose per gram of said unrefined soy protein material, wherein said unrefined soy protein material is derived from soybeans from a soybean line having a heritable phenotype of low stachyose content.

70. The functional food ingredient of claim 61 wherein said unrefined plant protein material has a protein content of less than 65% plant protein by weight on a moisture-free basis.

71. The functional food ingredient of claim 70 wherein said unrefined plant protein material has a plant protein content of less than 60% plant protein by weight on a moisture-free basis.

72. The functional food ingredient of claim 61 wherein said unrefined plant protein material has a plant protein content of at least 20% plant protein by weight on a moisture-free basis.

73. The functional food ingredient of claim 61 wherein said unrefined plant protein material has a water activity of 0.3 or less.

74. The functional food ingredient of claim 61 further comprising sodium tripolyphosphate, sodium acid pyrophosphate, guar gum, or a mixture thereof.

75. A functional food ingredient comprising an unrefined soy protein material selected from the group consisting of soy flour, soy grits, soy meal, and soy flakes, said unrefined soy protein material:
(a) forming a gel having a gel weight of at least 30 grams at a temperature of from about 15° C. to about 25° C. in a 5 fluid ounce mixture of 5 parts water per 1 part unrefined soy protein material, by weight;
(b) forming an unrefined soy protein material/water mixture having a refrigerated gel strength of at least 50 grams when mixed with 5 parts of water per part of unrefined soy protein material;
(c) having a nitrogen solubility index of from 30% to 80%;
(d) forming an aqueous slurry having a viscosity of at least 500 centipoise at a temperature of 15° C. to 25° C. when mixed with 7 parts of water per part of unrefined soy protein material, by weight;
(e) having a water hydration capacity of at least 3.75 times the weight of the unrefined soy protein material; and (f) having a salt tolerance index of from 30% to 80%.

76. The functional food ingredient of claim 75 wherein said unrefined soy protein material:

(a) has a water activity of 0.3 or less (b) contains less than 20 ppm n-pentane, 50 ppm pentanal, 650 ppm hexanal, 10 ppm 2-heptanone, 10 ppm 2-pentyl furan, and 10 ppm octanal;

(c) has a trypsin inhibitor activity of at most 10 trypsin inhibitor activity units per milligram of said unrefined soy protein material; and (d) has a moisture content of less than 6% by weight.

77. The functional food ingredient of claim 76 wherein said unrefined soy protein material contains at most 20 μmol of raffinose per gram of said unrefined soy protein material, and at most 35 μmol of stachyose per gram of said unrefined soy protein material, wherein said unrefined soy protein material is derived from soybeans from a soybean line having a heritable phenotype of low stachyose content.

78. The functional food ingredient of claim 74 wherein said unrefined soy protein material contains at most 20 μmol of raffinose per gram of said unrefined soy protein material, and at most 35 μmol of stachyose per gram of said unrefined soy protein material, wherein said unrefined soy protein material is derived from soybeans from a soybean line having a heritable phenotype of low stachyose content.

* * * * *